US008034629B2

(12) United States Patent
Chapin et al.

(10) Patent No.: US 8,034,629 B2
(45) Date of Patent: Oct. 11, 2011

(54) HIGH PRECISION SCANNING OF ENCODED HYDROGEL MICROPARTICLES

(75) Inventors: Stephen C. Chapin, Cambridge, MA (US); Patrick Seamus Doyle, Cambridge, MA (US); Daniel Colin Pregibon, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 65 days.

(21) Appl. No.: 12/552,268

(22) Filed: Sep. 1, 2009

(65) Prior Publication Data

US 2010/0330693 A1 Dec. 30, 2010

Related U.S. Application Data

(60) Provisional application No. 61/220,782, filed on Jun. 26, 2009.

(51) Int. Cl.
*G01N 1/10* (2006.01)

(52) U.S. Cl. ............ 436/180; 436/52; 436/172; 422/81; 422/105

(58) Field of Classification Search ........................ None
See application file for complete search history.

(56) References Cited

U.S. PATENT DOCUMENTS

| | | | | |
|---|---|---|---|---|
| 6,159,739 | A * | 12/2000 | Weigl et al. | 436/52 |
| 6,488,872 | B1 | 12/2002 | Beebe et al. | |
| 6,532,061 | B2 | 3/2003 | Ortyn et al. | |
| 6,592,821 | B1 | 7/2003 | Wada et al. | |
| 6,934,408 | B2 | 8/2005 | Frost et al. | |
| 7,438,792 | B2 | 10/2008 | Mathies et al. | |
| 2004/0043506 | A1 | 3/2004 | Haussecker et al. | |
| 2005/0043428 | A1 | 2/2005 | Caneba et al. | |
| 2006/0228386 | A1 | 10/2006 | Stephens et al. | |
| 2007/0054119 | A1 | 3/2007 | Garstecki et al. | |
| 2007/0105972 | A1 | 5/2007 | Doyle et al. | |

OTHER PUBLICATIONS

Chung, S. et al., Plastic microchip flow cytometer based on 2- and 3-dimensional hydrodynamic flow focusing, journal, Oct. 2003, pp. 535-533, vol. 9, Microsystem Technologies, Springer-Verlag, Heidelberg, Germany.
Chung, T. et al., Recent advances in miniaturized microfluidic flow cytometry for clinical use, journal, Aug. 2007, pp. 4511-4520, vol. 28, Electrophoresis, Wiley-VCH Verlag, Weinheim, Germany.
Crosland-Taylor, P.J., A Device for Counting Small Particles suspended in a Fluid through a Tube, journal, Jan. 1953, pp. 37-38, vol. 171, No. 4340, Nature Publishing Group.

(Continued)

*Primary Examiner* — Yelena Gakh
*Assistant Examiner* — Robert Xu
(74) *Attorney, Agent, or Firm* — Evans & Molinelli PLLC; Eugene Molinelli

(57) ABSTRACT

Techniques are provided for high precision scanning of hydrogel microparticles. The high precision is achieved by one or more modifications to the microparticle composition, or microfluidics apparatus that align the microparticles in a detection channel, or method of preparing a sample for introduction into the apparatus, or some combination. An apparatus comprises a body structure having formed therein a central channel and multiple focusing channels in fluid communication with the central channel through multiple junctions. A width of the central channel is smaller in a portion downstream of each junction. A particle comprises a hydrogel matrix and a probe molecule. The particle has an aspect ratio greater than about three. A method includes loading into a sample fluid inlet a mixture, wherein a number of particles lies within a range from about 15 to about 20 particles/μl.

10 Claims, 12 Drawing Sheets

OTHER PUBLICATIONS

Faivre, M., et al., Geometrical focusing of cells in a microfluidic device: An approach to separate blood plasma, journal, Jan. 2006, pp. 147-159, vol. 43, Biorheology, IOS Press, United States.
Huh, D., et al., Microfluidics for flow cytometric analysis of cells and particles, journal, Feb. 2005, pp. R73-R98, vol. 26, Physiological Measurement, Institute of Physics Publishing, UK.
Kellar, K. et al., Multiplexed microsphere-based flow cytometric immunoassays for human cytokines, journal, Jun. 2003, pp. 277-285, vol. 279, Jounal Immunological Methods, Elsevier.
Morgan, E. et al., Cytometric bead array: a multiplexed assay platform with applications in various areas of biology, journal, Nov. 2003, pp. 252-266, vol. 110, Clinical Immunology, Elsevier.
Pregibon, D. et al., Multifunctional Encoded Particles for High-Throughput Biomolecule Analysis, journal, 2007, pp. 1393-1396, vol. 315, Science, American Association for the Advancement of Science, Washington, DC, US.
Simonnet, C., et al., High-Throughput and High-Resolution Flow Cytometry in Molded Microfluidic Devices, journal, Aug. 2006, pp. 5653-5663, vol. 78, No. 16, Analytical Chemistry, American Chemical Society, US.
Yang, A. et al., Hydrodynamic focusing investigation in a micro-flow cytometer, journal, Dec. 2006, pp. 113-122, vol. 9, Biomed Microdevices, Springer Science + Business Media, LLC.
International Search Report, PCT/US2009/061474, Oct. 21, 2009, pp. 1-11.
Evans, Mark, et al., An Encoded Particle Array Tool for Multiplex Bioassays, journal, Feb. 2003, pp. 199-207, vol. 1, No. 1-2, ASSAY and Drug Development Technologies, Cambridge, United Kingdom.
Fulton, R. Jerrold, et al., Advanced multiplexed analysis with the FlowMetrix system, journal, Jun. 19, 1997, pp. 1749-1756, vol. 43, No. 9, Clinical Chemistry, Austin, TX, United States.
Kellar, Kathryn L., et al., Multiplexed microsphere-based flow cytometric assays, journal, 2002, pp. 1227-1237, vol. 30, Elsevier Science Inc., United States.
Nicewarner-Pena, et al., Submicrometer Metallic Barcodes, magazine, Oct. 5, 2001, pp. 137-141, vol. 294, No. 5540, Science, The American Association for the Advancement of Science, Washington D.C., United States.
Sha, Michael Y., et al., Multiplexed SNP genotyping using nanobaroode particle technology, journal, Jan. 19, 2006, pp. 658-666, vol. 384, No. 3, Analytical and Bioanalytical Chemistry, Springer Berlin/Heidelberg, United States.
Zhi, Zheng-liang, et al., Micromachining Microcarrier-Based Biomolecular Encoding for Miniaturized and Multiplexed Immunoassay, journal, Jul. 12, 2003, pp. 4125-4131, vol. 75, No. 16, Analytical Chemistry, American Chemical Society, United States.

* cited by examiner

500

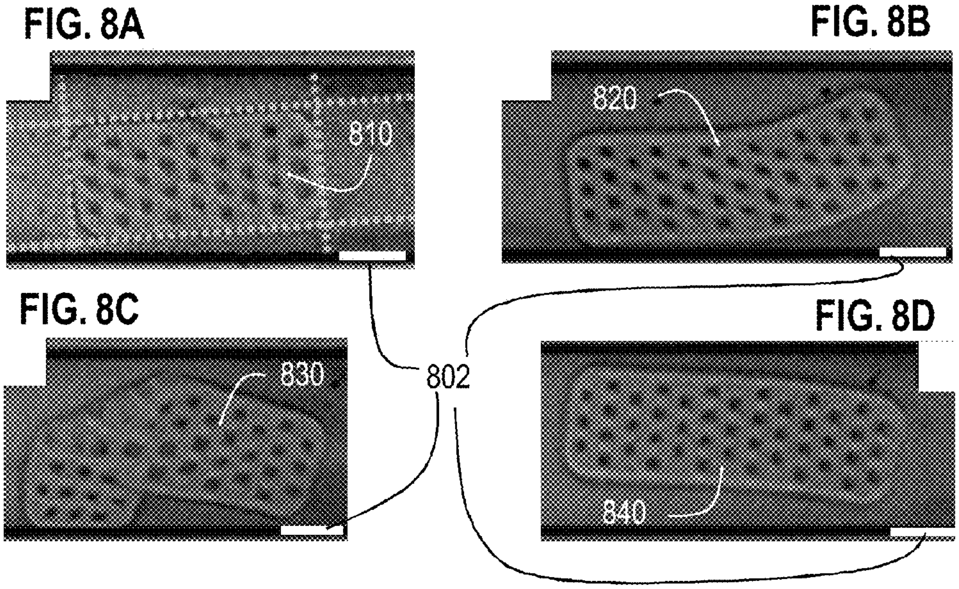
FIG. 9
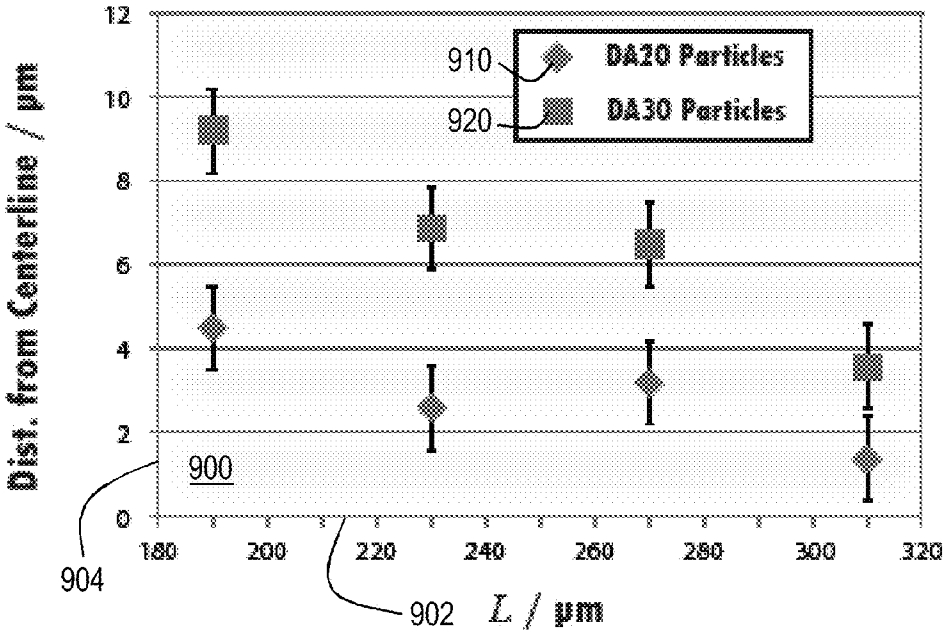

HIGH PRECISION SCANNING OF ENCODED HYDROGEL MICROPARTICLES

CROSS-REFERENCE TO RELATED APPLICATIONS

This application claims benefit of Provisional Appln. 61/220,782, filed Jun. 26, 2009, the entire contents of which are hereby incorporated by reference as if fully set forth herein, under 35 U.S.C. §119(e).

This application is related to U.S. utility application Ser. No. 11/867,217 filed Oct. 4, 2007 and published as US Patent Application Publication US 2008/0176216 on Jul. 24, 2008 (hereinafter Doyle I), the entire contents of which are hereby incorporated by reference as if fully set forth herein.

This application is related to U.S. utility application Ser. No. 11/586,197 filed Oct. 25, 2006 and published as US Patent Application Publication US 2007/0105972 on May 10, 2007 (hereinafter Doyle II), the entire contents of which are hereby incorporated by reference as if fully set forth herein

STATEMENT OF GOVERNMENTAL INTEREST

This invention was made with Government support under Contract No. 21EB008814 awarded by the National Institute of Biomedical Imaging and Bioengineering, National Institutes of Health. The Government has certain rights in the invention.

BACKGROUND

The ability to accurately detect and quantify biological molecules in a complex mixture is crucial in both basic research and clinical settings. Advancements in the fields of genomics and proteomics require robust technologies that can obtain high-density information from biological samples in a rapid and cost-effective manner. High-throughput screening for genetic analysis, combinatorial chemistry, and clinical diagnostics benefits greatly from multiplexed analysis, which is the simultaneous detection of several target molecules. This approach significantly reduces the required assay time, sample volume, and cost. However, it requires an encoding scheme to identify which, of a large number of immobilized probe species that bind with specific labeled target molecules in the sample, is being detected during analysis.

EXAMPLE EMBODIMENTS

Techniques are provided for high precision scanning of hydrogel microparticles. The high precision is achieved by one or more modifications to the microparticle composition, or microfluidics apparatus that align the microparticles in a detection channel, or method of preparing a sample for introduction into the apparatus, or some combination.

In one set of embodiments, an apparatus comprises a body structure having formed therein multiple microfluidic channels, each having at least one dimension in a size range from about 0.1 micron to about 500 micrometers (μm, 1 μm=$10^{-6}$ meters). The microfluidic channels include a central channel and multiple focusing channels in fluid communication with the central channel through multiple junctions. A width of the central channel is smaller in a portion downstream of each junction than in a portion upstream of that junction.

In another set of embodiments, a particle comprises a hydrogel matrix and a probe molecule. The particle has a greatest particle dimension less than about 500 micrometers (μm, 1 μm=$10^{-6}$ meters), and an aspect ratio of length to width greater than about three. The probe molecule is selected to bind to a target molecule.

In another set of embodiments, a method includes providing an apparatus comprising a body structure having formed therein multiple microfluidic channels, including a central channel in fluid communication with a sample fluid inlet and multiple focusing channels in fluid communication with the central channel through multiple junctions. The method also includes providing multiple particles comprising hydrogel bodies sized to fit in the central channel, wherein each hydrogel body includes a first longitudinal portion encoded with a plurality of thickness variations and a probe molecule. The probe molecule is selected to bind to a target molecule and is associated with a particular plurality of thickness variations. Among the multiple particles are multiple different probe molecules. The method includes loading into the sample fluid inlet a mixture of a test sample with the particles, wherein a number of particles in the mixture lies within a range from about 15 particles per microliter (particles/μl, 1 μl=$10^{-6}$ liters) to about 20 particles/μl. The method includes detecting optical emissions from particles in the central channel downstream of a last one of the junctions. The method also includes determining presence of a target in the test sample based on the detected optical emissions. In some embodiments, determining the presence includes determining the amount of target in the test sample.

Still other aspects, features, and advantages are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8A through FIG. 8D are images of hydrogel particles in a detection zone, according to various embodiments;

FIG. 9 is a graph that illustrates dependence of microparticle position in a microfluidics channel on particle composition, according to various embodiments;

DETAILED DESCRIPTION

Figure 1:
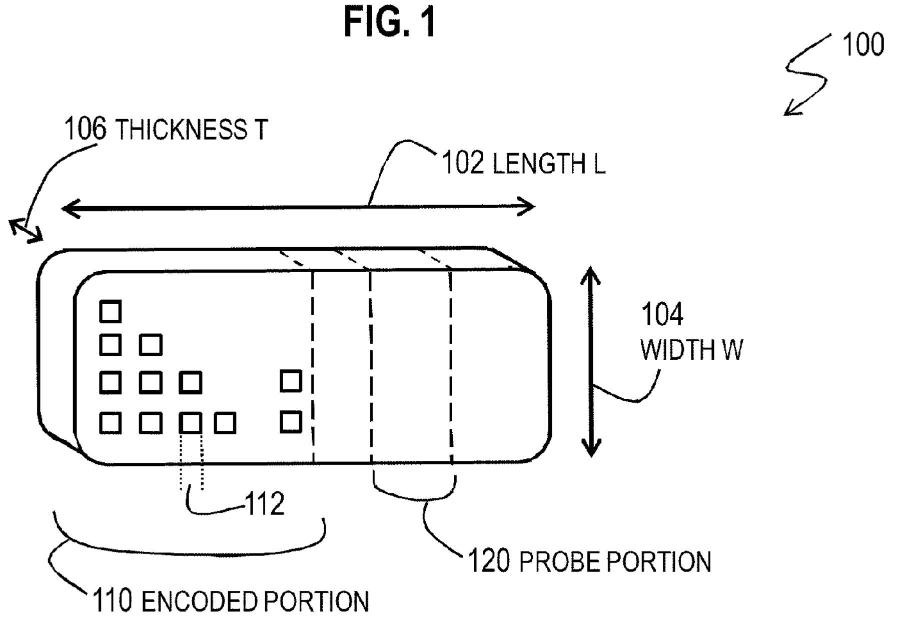
FIG. 1 is a block diagram that illustrates an example hydrogel microparticle, according to an embodiment.

A method and apparatus are described for high precision scanning of encoded hydrogel microparticles. In the following description, for the purposes of explanation, numerous specific details are set forth in order to provide a thorough understanding. It will be apparent, however, to one skilled in the art that some embodiments may be practiced without these specific details. In other instances, well-known structures and devices are shown in block diagram form in order to avoid unnecessarily obscuring the illustrated embodiments.

Some embodiments are described below in the context of detecting, with a single wavelength detector, both particle codes and fluorescently-labeled long molecule targets associated with processes in biological organisms. However, the invention is not limited to this context. In other embodiments, the apparatus, particles, or method, or some combination, can be used to decode particles or quantify targets based on fluorescence, chemiluminescence, magnetic properties, radioactivity, radio frequency, electrical resistance, opacity, or colorimetry, among other means. For optical approaches, single or multiple wavelengths may be used in a given assay. In addition, multiple detectors or excitation sources may be used. Targets may include biological entities such as proteins, nucleic acids, cytokines, lipids, whole cells, enzymes, antibodies, bioterror threats, or any range of chemicals from polymers to small molecules. Some specific applications include drug discovery, biomarker discovery, expression profiling, combinatorial chemistry, clinical diagnostics, or monitoring environmental samples for microorganisms or chemical agents.

Particle-based assay platforms exhibit several advantages over planar arrays in applications that involve the detection of low to medium target densities (1 to about 1000 different targets), or demand rapid modification of the probes to be fixed in the particles, or necessitate high-throughput processing of samples. Compared to planar arrays, the use of micrometer-sized particles (called microparticles herein, 1 micrometer, μm,=1 micron=$10^{-6}$ meters) leads to faster probe-target binding kinetics due to mixing during incubation, more efficient separation and washing steps, and higher degrees of reproducibility. (See for example, M. Evans, C. Sewter and E. Hill, "An Encoded Particle Array Tool for Multiplex Bioassays," *Assay and Drug Development Technologies,* 2003, vol. 1, pp 199-207; and Z. Zhi, Y. Morita, Q. Hasan and E. Tamiya, "Micromachining Microcarrier-based Biomolecular Encoding for Miniaturized and Multiplexed Immunoassay," *Analytical Chemistry,* 2003, vol. 75, pp 4125-4131.) The vast majority of particles used in suspension arrays are optically encoded latex microspheres with diameters between 0.3 and 10 microns that can be interrogated and decoded with laser-based flow cytometry (measurement of cell sized particles). Optical encoding is accomplished by swelling the spheres with fluorescent organic dyes with different emission spectra. Although used extensively, this scheme requires multiple excitations and is limited to the multiplexed sensing of only about 100 targets (also called analytes, herein) due to spectral overlap of particle encoding fluorescence and target-detection fluorescence. (See for example, R. J. Fulton, R. L. McDade, P. L. Smith, L. J. Kienker and J. R. K. Jr., "Advanced Multiplex Analysis with the Flowmetrix System," *Clin. Chem.,* 1997, vol. 43, pp 1749-1756; and K. L. Kellar and M. A. Iannone, "Multiplexed Microsphere-based Flow Cytometric Assays," *Exp. Hematol.,* 2002, vol. 30, pp 1227-1237.) Sub-micrometer rods with multiple metal stripes that serve as a graphical code for multiplexing have also been developed. (See for example, S. R. Nicewarner-Pena, R. G. Freeman, B. D. Reiss, L. He, D. J. Pena, I. D. Walton, R. Cromer, C. D. Keating and M. J. Natan, "Submicrometer Metallic Barcodes," *Science,* 2001, vol. 294, pp 137-141; and M. Sha, I. Walton, S. Norton, M. Taylor, M. Yamanaka, M. Natan, C. Xu, S. Drmanac, S. Huang, A. Borcherding, R. Drmanac and S. Penn, "Multiplexed SNP Genotyping Using Nanobarcode Particle Technology," *Anal Bioanal Chem,* 2006, vol. 384, pp 658-666.) However, the high density of such rods leads to rapid settling in solution and thus requires the rods to be vigorously mixed during assays, a procedure which can damage fragile biological molecules like antibodies. Moreover, a feasible high-throughput quantification and decoding strategy for the rods has not been introduced as of this writing, thereby significantly limiting the applicability of such rods in clinical or research settings.

According to various embodiments, particle based assays use coded hydrogel particles in an apparatus that effectively focuses and aligns the particles for efficient optical detection and high throughput. A hydrogel (also called aquagel) is a network of polymer chains that are water-insoluble. A polymer is a large molecule (macromolecule) composed of repeating structural units typically connected by covalent chemical bonds. Hydrogels are highly absorbent (they can contain over 99% water) and possess a degree of flexibility due to their significant water content. Because of this flexibility, hydrogel particles present special challenges for focusing and alignment in microfluidics channels, as are described in more detail below.

Particle

FIG. 1 is a block diagram that illustrates an example hydrogel microparticle 100, according to an embodiment. The particle has a longest dimension given by length L 102, a shortest dimension perpendicular to the length given by thickness T 106, and a dimension perpendicular to both given by width W 104. The particle is a microparticle, with all dimensions in a range from about 0.1 micrometers (μm, also called microns, 1 μm=$10^{-6}$ meters) to about 500 microns. The particle is shaped to align in microfluidics channel by having a length L 102 greater than a width W 104 greater than a thickness T 106. The particle 100 is made of a hydrogel matrix that includes one or more probe molecules loaded into a longitudinal portion along the length 102 of the particle 100 called a probe portion 120. The probe molecules are selected to bind to a particular type or types of target molecules.

In the same or different longitudinal portion called an encoded portion 110, a code is emplaced in the particle. Any method may be used to impart a code to the encoded portion. In an illustrated embodiment, the encoded portion is different from the probe portion and the thickness of the particle in the encoded portion decreases varying amounts to impart a spatial pattern that can be detected. The spatial pattern in the encoded portion 110 is associated with the probe molecules loaded into the probe portion 120.

Any spatial pattern may be used, such as ridges, gulleys and peaks. For example, in the illustrated embodiment the spatial pattern is a set of zero or more holes through the thickness of the particle. The light emitted from the encoded portion (e.g., via reflectance, transmittance or fluorescence) depends on the thickness of the particle in an optical scanning window. In an example embodiment, the hydrogel matrix in the encoded portion is loaded with a fluorescent entity. In some embodiments, different materials are deposited into one or more thin portions to enhance detectability, either with optical or other detectors, such as magnetic detectors, radio frequency detectors, and temperature detectors, among others. In some embodiments, different materials or structures are loaded into the hydrogel matrix to impart a code to be detected on each particle.

The horizontal scale 112 of thickness variations, i.e., in a horizontal plane perpendicular to the thickness, is related to the aperture of the optics or other detector used to detect the particle 100. In the illustrated embodiment, the hole size and spacing between holes are on the order of an optical window used to detect the particles, which in some embodiments is anticipated to be in a range from about 2 microns to about 8 microns.

The number of possible hole positions in the encoded portion determines the number of different codes that can be represented. In example embodiments, three to five hole positions are allowed in a column across the width of the particle and five to ten column positions are allowed at different positions along the length of the particle in the encoded portion 110. In the illustrated embodiment, up to four hole positions are depicted spaced in each column and six columns are depicted spaced longitudinally in the encoded portion 110 (allowing. Thus the illustrated embodiment has an encoded portion 110 that is about 18 to 80 microns wide and about 26 to 100 microns long, accounting for the size of spaces between holes as well as the holes. For an encoded portion with three hole positions per column and 7 columns, over 3000 unique codes can be provided.

In some embodiments, the probe portion 120 is distinct from the encoded portion. An advantage of this arrangement is that the same detector can be used to detect both the code and the binding of target molecules to probe molecules. For a particle on which the encoded portion 110 is one half to one quarter the length of the particle, the particle lengths are about 50 to 400 microns.

The thickness T 106 is chosen to be sufficient to provide structural integrity to the particle, while still being thin enough to enable the formation of thickness variations, such as holes, which are of sufficient magnitude to be detected. In example embodiments, the thickness is in a range from about 10 microns to about 40 microns to enable the formation of holes during the cross-linking process used to fabricate the hydrogel matrix. Thickness variations may be formed in any manner. In some embodiments thickness variations are generate, at least in part, using lock release lithography (LRL, see Ki Wan Bong, Daniel C. Pregibon and Patrick S. Doyle, "Lock release lithography for 3D and composite microparticles," *Lab on a Chip*, The Royal Society of Chemistry, London, v9, pp 863-86, 2009).

According to several embodiments, an aspect ratio of length L 102 to width W 104 of particle 100 is greater than three (3). For example, in some embodiments, described in more detail below, the aspect ratio is about 3.4. An advantage of aspect ratio greater than 3 is that such particles tend to align with the direction of flow even in wider regions of microfluidics channels in an apparatus used to observe the particles. The alignment of the particles with the flow makes it easier to get the particles positioned for the detector, as described in more detail below.

According to some embodiments, the encoded portion 110 is more rigid and less porous than the rest of the particle, including the probe portion 120. This is an advantage because the encoded portion better retains its structure to reduce errors in reading the code, while the increased porosity of the remaining portion allows more probe molecules to be loaded into the hydrogel matrix for a better signal strength related to binding. The hydrogel is largely transparent; and the deeper the penetration of probe molecules, the more binding opportunities when the particle is exposed to a sample with target molecules, and the more emitted light indicative of binding can reach the detector.

Example hydrogel compositions that provide acceptable rigidity and porosity difference between the encoded portion 110 and different longitudinal portions of the particle are described in more detail below and in Table 1. The more rigid hydrogel composition includes about 30% Poly(ethylene glycol) (700) diacrylate and about 30% Poly(ethylene glycol) (200), called DA30 hereinafter, where 700 and 200 refer to the molecular weights of the corresponding polymers. The more porous hydrogel composition includes about 20% Poly (ethylene glycol) (700) diacrylate and about 40% Poly(ethylene glycol) (200), called DA20 hereinafter. Thus the hydrogel matrix in the first longitudinal portion comprises more Poly(ethylene glycol) (700) diacrylate and less Poly(ethylene glycol) (200) than does the hydrogel matrix in the second longitudinal portion.

The hydrogel particles of such composition may be formed in any manner known in the art. In some embodiments, the hydrogel particles with loaded fluorescent entities or probes or both are formed using techniques described below or in Doyle I or Doyle II, cited and incorporated by reference above.

Apparatus.

Figure 2:
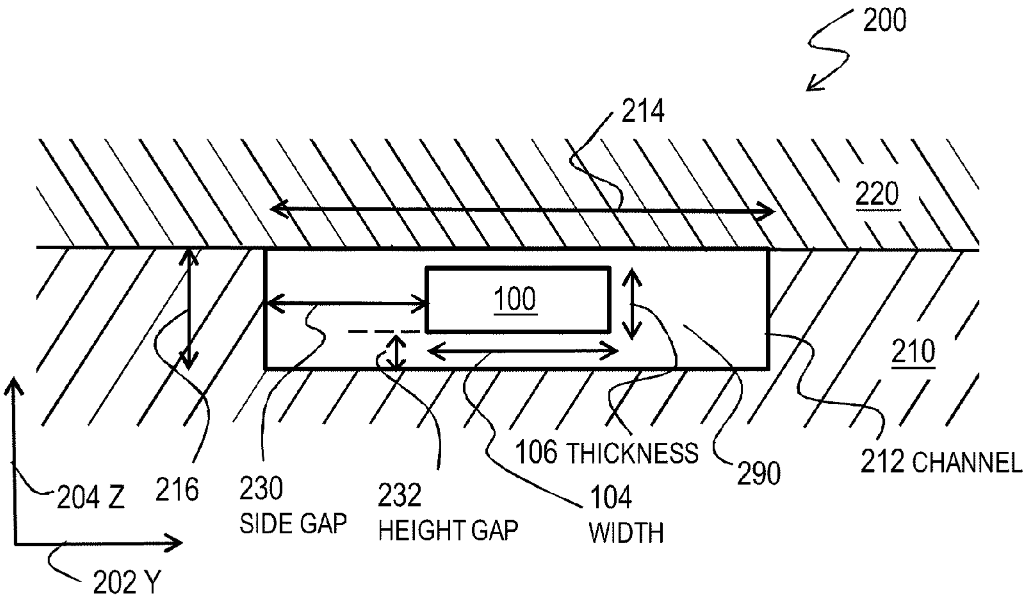
FIG. 2 is a block diagram that illustrates an example elevation view of the hydrogel particle in a microfluidics channel, according to an embodiment.

FIG. 2 is a block diagram that illustrates an example elevation view 200 of the hydrogel particle in a microfluidics channel, according to an embodiment. The microfluidics channel 212 is formed in a lower substrate 210, e.g., by photolithography, etching or other means, well known in the art, and covered with an upper structure 220 of the same or different material.

Any method may be used to construct the apparatus. For example the channels and chambers are constructed on a planar substrate by etching, injection molding, embossing, or stamping. Lithographic and chemical etching processes developed by the microelectronics industry are used routinely to fabricate microfluidic apparatus on silicon and glass substrates. Similar etching processes also can be used to construct microfluidic apparatus on various polymeric substrates as well. After construction of the network of microfluidic channels and reservoirs on the substrate, the substrate typically is attached to one or more planar sheets that seal channel and chamber tops and/or bottoms while providing access holes for fluid injection and extraction ports Any material appropriate for a particular use may be employed for substrate 210 and upper structure 220. For example, in various embodiments the materials are selected from a group including elastomer, glass, a silicon-based material, quartz, fused silica, sapphire, polymeric material, and mixtures thereof. The polymeric material may be a polymer or copolymer including, but not limited to, polymethylmethacrylate (PMMA), polycarbonate, polytetrafluoroethylene (e.g., TEFLON™), polyvinylchloride (PVC), polydimethylsiloxane (PDMS), polysulfone, and mixtures thereof. Such polymeric substrate materials are desirable for their ease of manufacture, low cost, and disposability, and because they tend to be inert.

The channel has width 214 in the y direction 202 that is horizontal and perpendicular to the horizontal direction of flow, and depth 216 in the vertical z direction 204. Although particular orientations are referred to as horizontal and vertical for purposes of illustration, there is no requirement that the channel have a particular orientation with respect to the gravitational field of the Earth.

A fluid 290 bearing one or more particles 100 flows through channel 212. Any fluid may be used. It is generally desirable that the fluid not degrade the particle 100 or the probe molecule or target molecule, if any, bound to the probe. It is also desirable for the fluid to have viscosity and density that favors laminar flow in the channels of the substrate, such as channel 212. Many fluids used as buffers for biological molecules are suitable, including fluids described in more detail below.

The particle 100 has width 104 less than channel width 214 and thickness 106 less than channel depth 216.

At least one of the cross sectional dimensions of channel 212, i.e., width 214 or depth 216, is in the range from 0.1 microns to 500 microns. In the illustrated embodiments, both cross-sectional dimensions are in the range from 0.1 microns to 500 microns. The distance from a side wall of the channel to the particle is called the side gap 230; and the height from the bottom of the channel to the bottom of the particle is called the height gap 232. It is desirable that an apparatus be configured so that the side gap 230 and height gap 232 are well controlled and well known when the encoded portion and probe portion of the particle are to be detected.

Figure 3A:
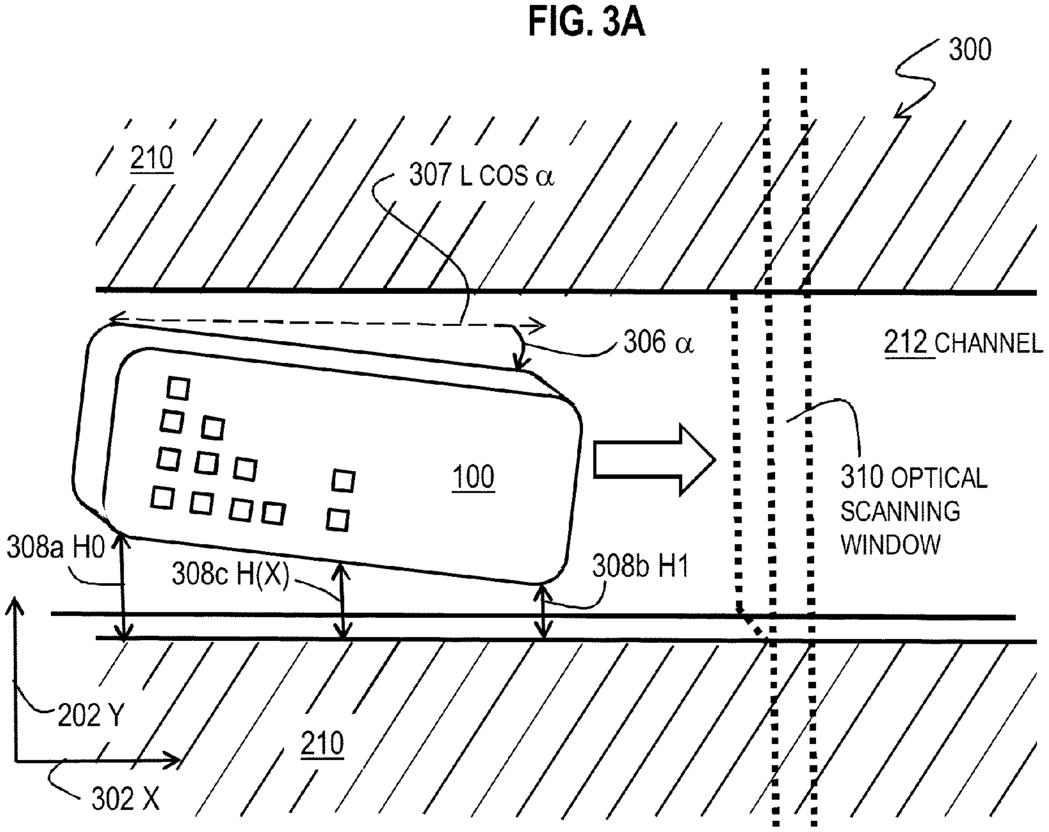
FIG. 3A is a block diagram that illustrates an example view looking down into a microfluidics channel in a detection zone, according to an embodiment.

FIG. 3A is a block diagram that illustrates an example view 300 looking down into a microfluidics channel in a detection zone, according to an embodiment. The channel 212 in the substrate 210 has width 214 in the y direction 202 that is horizontal and perpendicular to the horizontal x direction 302 of flow indicated by the open arrow. At a particular x position along the channel 212 is an optical scanning window 310 that is depicted extending across the entire channel width and reaching down to the bottom of the channel 212, but limited in the x direction of flow. The length in the x direction is the scale of the scanning window for purposes of determining the scale 112 of thickness variations in the particle. The particle 100 moving with the flow is about to intersect the optical scanning window 310.

For purposes of illustration, it is assumed that the particle 100 is not perfectly aligned, i.e., parallel, to the side walls of the channel 212, but deviates by an angle α 306. This results in a side gap, represented by the symbol h that varies with distance in the x direction. The side gap at the trailing edge of the particle is given by h0 308a, at the leading edge of the particle by h1 308b, and by an intermediate position x by h(x) 308c. As a result of the tip by angle α 306, the distance the particle cover when passing the optical scanning window, or any other point x, is L cosine α, as shown by line segment 307. These parameters α and h(x) are referenced later when describing the restoring forces acting to align the particle 100.

Figure 3B:
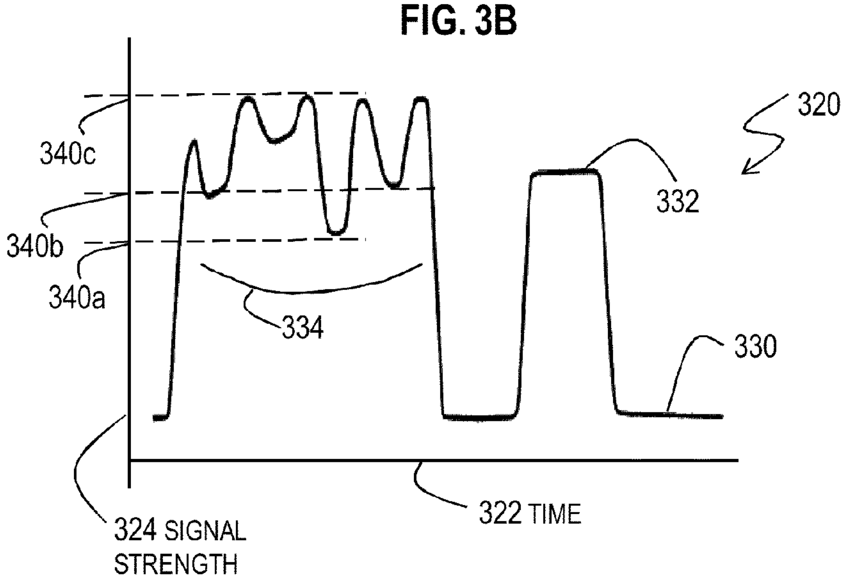
FIG. 3B is a graph that illustrates an example measurement of optical emissions at a detector in the detection zone, according to an embodiment.

FIG. 3B is a graph 320 that illustrates an example measurement of optical emissions at a detector in the detection zone, according to an embodiment. The horizontal axis 324 indicates time and the vertical axis 324 indicates signal strength increasing upwards. The strength of the signal resulting from measuring optical emissions, such as fluorescence, in the optical scanning window 310 is presented as trace 330. To more readily depict the relation of peak signal strength on trace 330 to longitudinal position on particle 100 moving left to right, time on axis 322 decreases to the right. The leading portion detected first is shown on the right as the peak 322 corresponding to target bound to the probe portion of particle 100. This is followed by the fluorescence signal 334 detected in the encoded portion, which varies depending on the number of holes in a column. The fewer holes, the more fluorescence and the greater the signal strength. No holes in a column corresponds to highest signal strength level 340c, all four holes corresponds to lowest signal strength 340a, and one or two holes corresponds to intermediate signal strength 340b.

Particle grouping or misalignment in the optical scanning window, e.g., due to varying side gaps and height gaps, or deformation of these flexible particles, can lead to signal variations that are misinterpreted as target signatures or code changes. In some embodiments, the scanning window is limited in the cross channel y direction as well as the long channel x direction; and, is thus capable of detect individual rows of holes. Several such scanners can be used to detect all rows of the encoded portion. Such scanning is especially susceptible to small errors in the cross channel position y of the particle as it passes the scanner. Thus an apparatus is needed to align the particles 100 in a relatively narrow channel 212 in a detection zone with a scanning window 310. The task is challenging because the particles are oriented and spaced at random in the sample where the probe molecules are exposed to any targets that might be in the sample.

Figure 4:
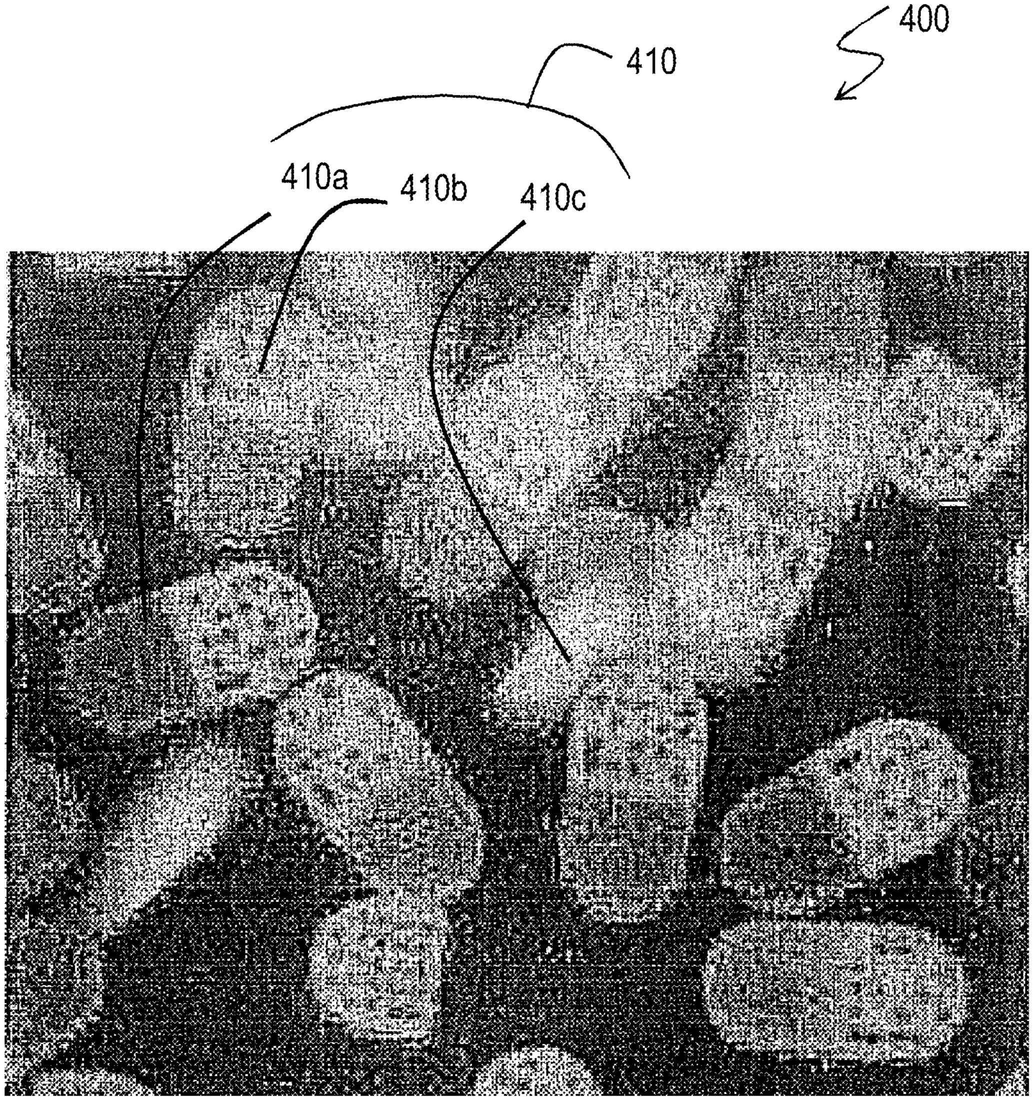
FIG. 4 is an image that illustrates a mixture of hydrogel particles in a fluid sample, according to an embodiment.

FIG. 4 is an image 400 that illustrates a mixture of hydrogel particles in a fluid sample, according to an embodiment. Particles are shown to be oriented at random not only in the plane of the image, as indicated by particles 410a and 410b, but also in a dimension perpendicular to that plane, as indicated by the out of focus blurs of different lengths, such as blur 410c.

Figure 5A:
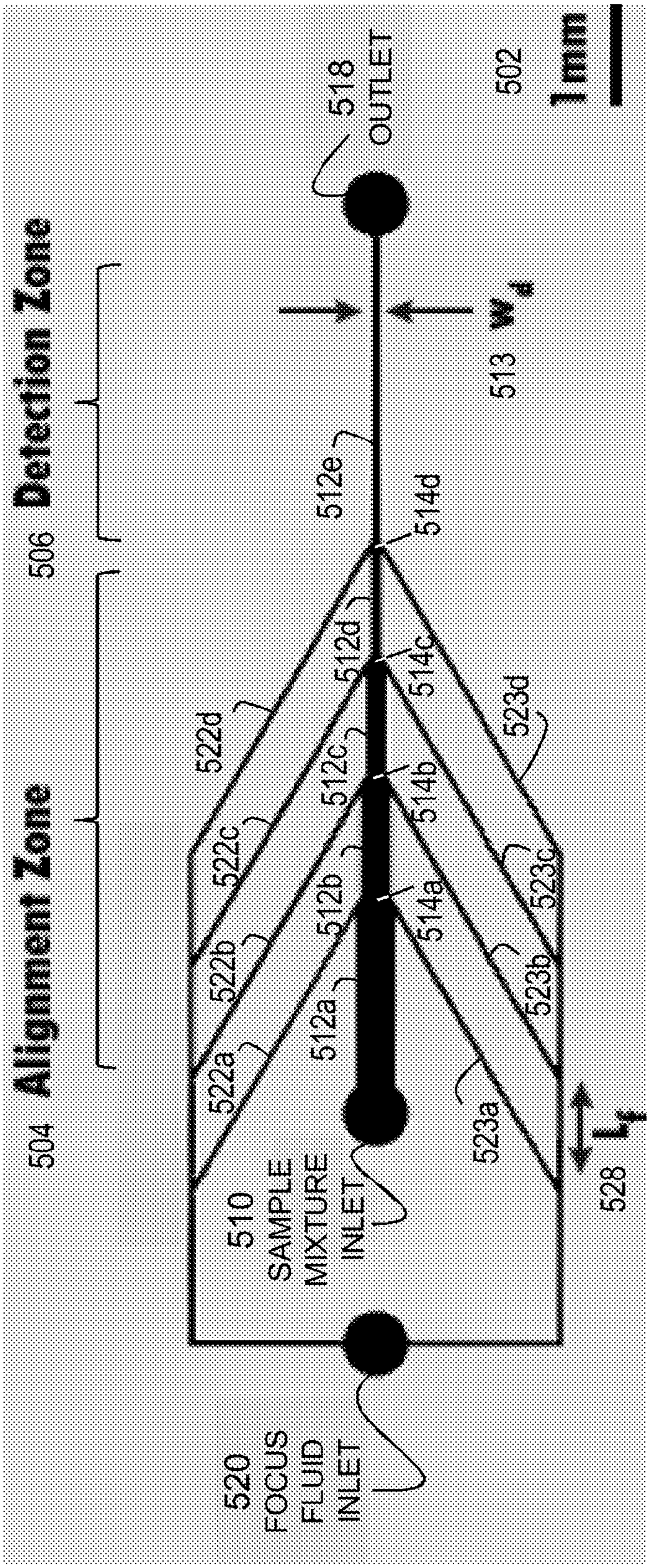
FIG. 5A is a diagram of microfluidics channels in an example apparatus, according to an embodiment.

FIG. 5A is a diagram of microfluidics channels in an example apparatus 500, according to an embodiment. The microfluidics channels include a sample mixture inlet chamber 510 and outlet chamber 518 in fluid communication with a central channel comprising a first portion 512a, a second portion 512b, a third portion 512c, a fourth portion 512d and a fifth portion 512e, collectively called portions of a central channel 512 hereinafter. The flow of particles is in a flow direction from the sample mixture inlet chamber 510 to the outlet chamber 518, induced by an applied pressure difference between inlet chamber 510 and outlet chamber 518. Although called a central channel to emphasize the desired position of the particles in the center of the channel, the name does not imply a requirement that the central channel be located in the center of the apparatus or midway between any or all portions of the other channels or chambers in the apparatus.

The apparatus 500 also includes multiple focus fluid channels that are in fluid communication with the central channel 512 at junctions 514a, 514b, 514c and 514d, collectively referenced hereinafter as junctions 514. A pair of focus fluid channels connects to the central channel at each junction. As depicted, focus fluid channels 522a and 523a connect to the central channel at junction 514a. Similarly, focus fluid channels 522b and 523b connect to the central channel at junction

514*b*; focus fluid channels 522*c* and 523*c* connect to the central channel at junction 514*c*; and, focus fluid channels 522*d* and 523*d* connect to the central channel at junction 514*d*. The focus fluid channels 522*a* through 522*d* and 523*a* through 523*d*, collectively referenced hereinafter as focus fluid channels 522, are also in fluid communication with a focus fluid inlet 520.

The central channel portion (e.g. portion 512*e*) downstream of the last junction (e.g., junction 514*d*) is called the detection zone 506. In the detection zone 506, the particles are sufficiently aligned for high precision detection of target binding to the probe portion and high precision detection of the code in the encoded portion. The width of the central channel in the detection zone is called the detection width Wd 513. According to some embodiments, the detection width Wd 513 is about twice the width of the particles. An advantage of this relationship, as described in more detail below, is that the flexible hydrogel particles are less likely to be deformed as they enter this portion of the central channel.

Between the sample mixture inlet chamber 510 and the detection zone 506 is the alignment zone 504 where the focus fluid channels join the central channel at multiple junctions 514.

According to various embodiments, the width of the central channel 512 decreases downstream of each junction 514 to the width Wd 513 in the detection zone. An advantage of this feature, as described in more detail below, is that particles are less likely to cluster at the mouth of the detection zone of the central channel.

In some embodiments, as described in more detail below, the change in channel width from one portion of the central channel to another is limited to be no greater than about twice the length of the particle, e.g., about 400 microns in an illustrated embodiment. An advantage of this constraint, as described in more detail below, is that the flexible hydrogel particles are even less likely to cluster. In the illustrated embodiment, the decrease in width is abrupt at the junction and the width is constant in each portion of the central channel between successive junctions.

According to some embodiments, the distance between junctions, called the junction spacing Lf 528, is greater than two particle lengths, e.g. Lf 528 is about one millimeter (1000 microns) or more. As described in more detail below, an advantage of longer focus channel spacing is that the particles appear to have more time to separate and line up parallel to the central channel, especially in the wider portions of the central channel.

This apparatus 500 has been shown effective in aligning hydrogel particles in a detection zone for high precision detection, as described in more detail below.

Figure 5B:
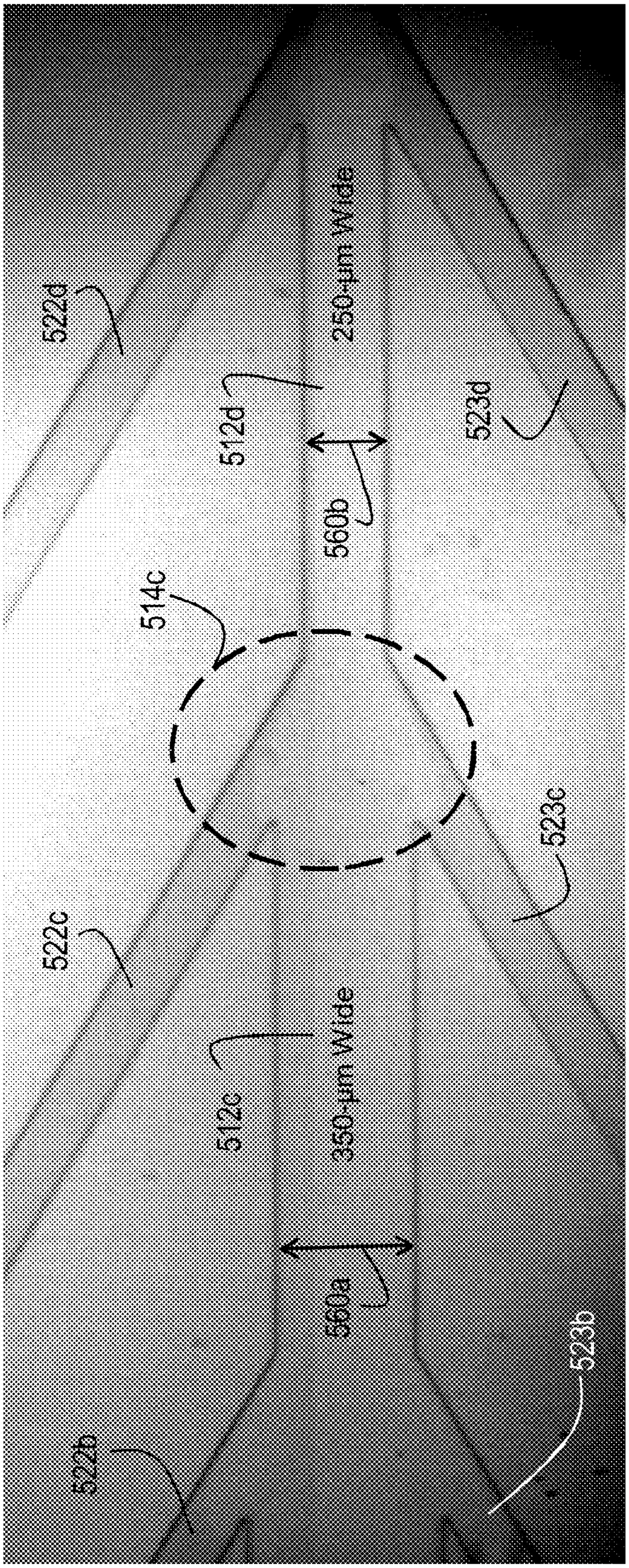
FIG. 5B is an image of a portion of microfluidics channels in an example apparatus, according to an embodiment.

FIG. 5B is an image of a portion of microfluidics channels in an example apparatus, according to an embodiment. The image depicts portion 512*c* and portion 512*d* of the central channel, the junction 514*c* between those portions and the focus fluid channels 522*c* and 523*c* that join the central channel in junction 514*c*. Also depicted are portions of focus fluid channels 522*b* and 523*b* that join the central channel at the junction immediately upstream of junction 514*c*, and portions of focus fluid channels 522*d* and 523*d* that join the central channel at the junction immediately downstream of junction 514*c*. FIG. 5B clearly depicts the abrupt change in width of the central channel at junction 514*c*, from width 560*a* upstream of the junction to smaller width 560*b* downstream of the junction, and the constant width in each of central channel portions 512*c* and 512*d*. FIG. 5B also indicates that the upstream width 560*a* is 350 microns and the downstream width 560*b* is 250 microns in the illustrated embodiment. The difference is 100 microns, which satisfies the constraint that the width change at the junction not be greater than about 400 microns.

Figure 6:
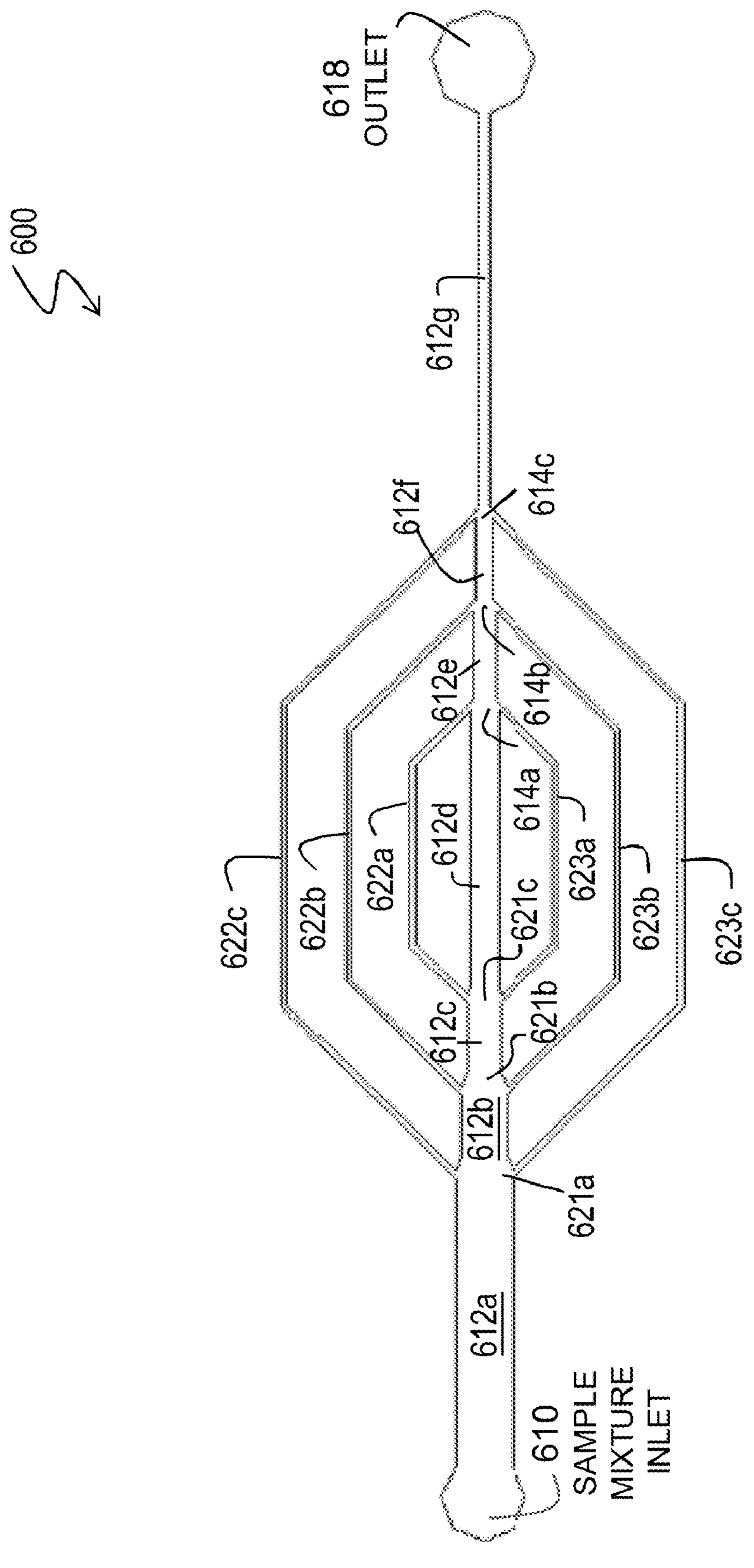
FIG. 6 is a diagram of microfluidics channels in another example apparatus, according to an embodiment.

FIG. 6 is a diagram of microfluidics channels in another example apparatus 600, according to an embodiment. In this embodiment there is not a separate inlet for focusing fluid. Instead, fluid from the sample mixture is used as the focus fluid. Similar to apparatus 500, apparatus 600 includes a sample mixture inlet chamber 610 and outlet chamber 618 in fluid communication with a central channel. The central channel includes a different number of portions of constant width, including portion 612*a*, portion 612*b*, portion 612*c*, portion 612*d*, portion 612*e*, portion 612*f*, and portion 612*g*, collectively called portions of a central channel 612 hereinafter. The flow of particles is in a flow direction from the sample mixture inlet chamber 610 to the outlet chamber 618, induced by an applied pressure difference between inlet chamber 610 and outlet chamber 618.

Like apparatus 500, apparatus 600 also includes multiple focus fluid channels that are in fluid communication with the central channel 612 at junctions 614*a*, 614*b*, and 614*c*, collectively referenced hereinafter as junctions 614. A pair of focus fluid channels connects to the central channel at each junction. As depicted, focus fluid channels 622*a* and 623*a* connect to the central channel at junction 614*a*. Similarly, focus fluid channels 622*b* and 623*b* connect to the central channel at junction 614*b*; and focus fluid channels 622*c* and 623*c* connect to the central channel at junction 614*c*. The focus fluid channels 522*a* through 522*d* and 523*a* through 523*d* are collectively referenced hereinafter as focus fluid channels 622.

Unlike apparatus 500, however, focus fluid channels 622 are not in communication with a separate focus fluid inlet. Instead, the focus fluid channels 622 are in fluid communication with the sample mixture inlet chamber 610 through the central channel 612 and multiple inlet junctions, including inlet junction 621*a*, inlet junction 621*b* and inlet junction 621*c*, collectively referenced hereinafter as inlet junctions 621. In the illustrated embodiment the focus fluid channels 622 are narrower than the particle widths to prevent particles from entering the focus fluid channels 622 at the inlet junctions 621.

An advantage of the arrangement of apparatus 600 is that it is simpler to make and to operate than apparatus 500 that includes a separate focus fluid inlet chamber 510. A particular ratio of focus fluid flow rate to sample mixture flow rate can be achieved by fixing the widths of the focus fluid channels 622 compared to the central channel portion widths. An advantage of apparatus 500, is that the focus fluid can be driven at a separate pressure to obtain more or time-variable ratios of flow rates of the focus fluid relative to the sample mixture.

Method

Figure 7:
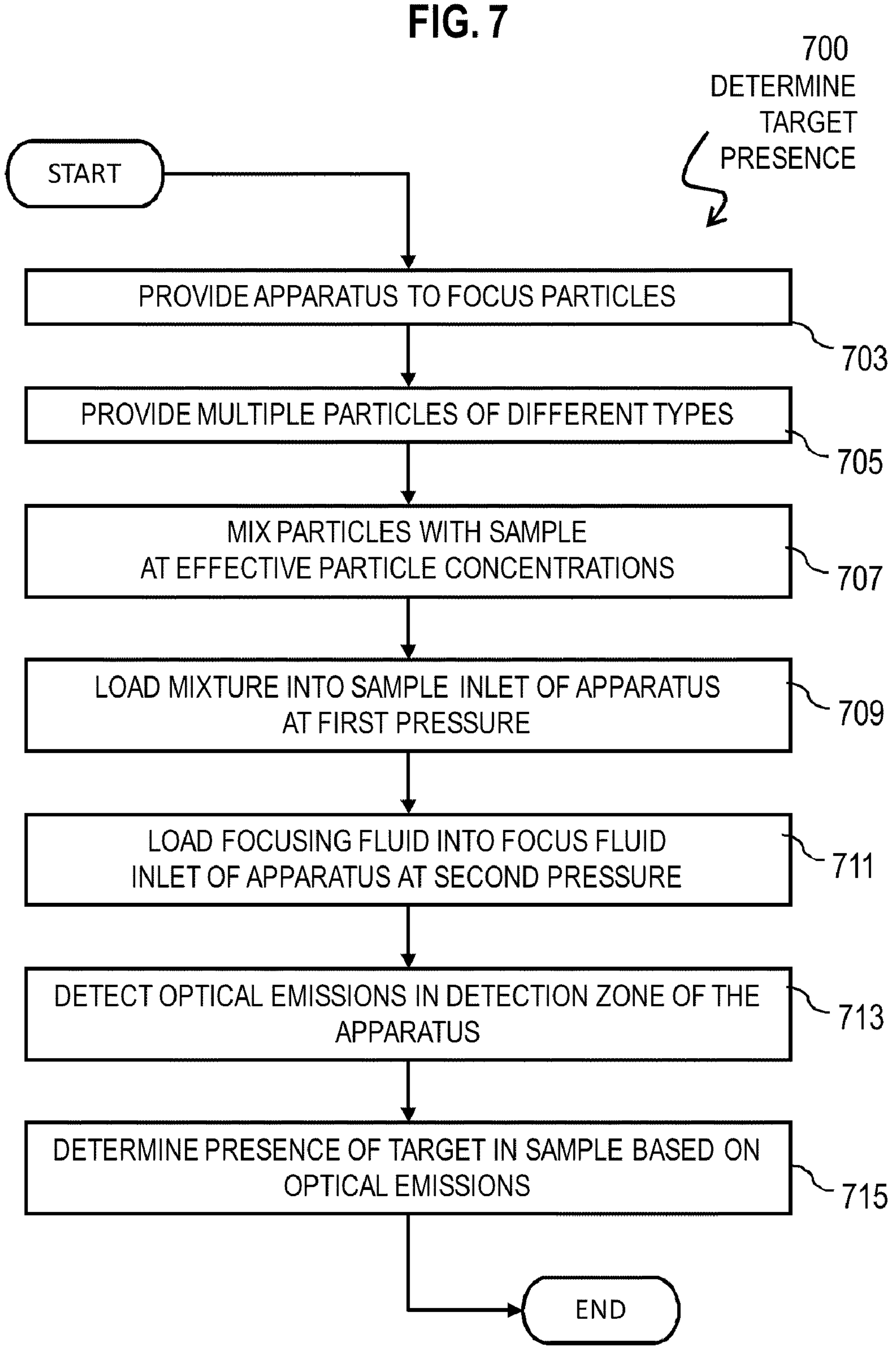
FIG. 7 is a flow diagram of a method for using hydrogel microparticles in an apparatus, according to an embodiment.

FIG. 7 is a flow diagram of a method 700 for using hydrogel microparticles in an apparatus, according to an embodiment. Although shown in a particular order for purposes of illustration, in other embodiments one or more steps, or portions, thereof, may be performed in a different order or overlapping in time, whether in series or parallel, or one or more steps may be omitted or one or more other steps added, or the method may be changed in some combination of ways.

The method 700 includes, in step 703, providing an apparatus, e.g., apparatus 500 or apparatus 600 or other apparatus known in the art, to focus the hydrogel particles in a fluid flow past a detector, such as an optical detector.

In step 705, multiple particles of one or more types are provided. For example, 1000 hydrogel microparticles, each with a first set of one or more probes in a longitudinal portion separate from an encoded portion, are provided. In some embodiments, step 705 includes providing multiple particles of each of two or more types. Each different type includes a different code and a different set of one or more probes associated with that code. For a given type, all particles have the same code and same set of one or more probes.

In step 707, the particles provided are mixed with a sample at effective particle concentrations. In an illustrated embodiment, mixtures are formed that result in particle concentrations within a range from about 16 particles per microliter (particles/μl, 1 μl=$10^{-6}$ liters) to about 23 particles/μl. It has been determined that for particles several tens of microns in width and length, higher particle concentrations lead to excessive particle volume compared to fluid volume, which interferes with either binding between probe and target or flow of particles through an apparatus, such as apparatus 500 or apparatus 600, or some combination. It has also been determined that for hundreds of different targets, and consequently different particle types, or more, in a typical 50 μl sample volume, lower concentrations lead to so few particles for each type as to reduce redundancy and, thus, increase measurement errors to undesirable levels.

In step 709, the mixture of sample and particles is loaded into the sample inlet chamber of an apparatus at a first pressure difference from the outlet chamber. Any method may be used to obtain the pressure difference, including increasing the pressure applied to the inlet chamber, or forming a vacuum at the outlet chamber, or both. In some embodiments, the mixture is formed by exposing the particles to a sample for a certain incubation time, and then rinsing the sample off the particles and providing the exposed particles in a mixture fluid that does not include target molecules that are not bound to probe molecules in a particle.

In step 711, a focusing fluid is loaded into the focus fluid inlet of an apparatus at a second pressure difference from the outlet chamber. Again any method may be used to cause the pressure difference. In some embodiments, the apparatus does not include a separate focusing fluid or focus fluid inlet; and, step 711 is omitted.

In some embodiments, the pressure applied during step 709, or during steps 709 and 711, is chosen so that a fluid flow rate of the mixture fluid down the central channel is about equal to a sum of fluid flow rates through all the focus fluid channels. Thus, in these embodiments, steps 709 and step 711 include applying a first pressure at the sample fluid inlet and a second pressure at a focusing fluid inlet in fluid communication with the plurality of focusing channels so that a sum of flow rates through the plurality of focusing channels is about equal to a flow rate from the sample mixture fluid inlet.

In step 713 optical emission are detected in a detection zone of the apparatus. In other embodiments, other measurements are made in the detection zone during step 713, such as magnetic measurements, or thermal measurements. In step 715, the presence of the target molecule in the sample is determined based on the detections, e.g., the optical emissions. For example, in some embodiments only particles of one type are used and the apparatus is so effective at focusing the particles that the particles travel past the detector at a repeatable and known rate. The signal expected form the encoded portion, if any, can be removed from the measured signal to deduce the percentage or range of signal strengths of particles that exhibit binding to a target, for qualitative or quantitative analysis of the sample, respectively. In some embodiments, multiple particle types are used, and the code on each particle is also detected and used to determine the presence or absence of target molecules in the sample.

Example Embodiments Fabrication

In the embodiments described in this and following sections, one or more of the following methods were used to fabricate the particle fabrication devices, the particles or the particle-focusing devices.

The microfluidic devices used to synthesize particles and to generate ordered particle flows were fabricated in polydimethylsiloxane (PDMS) (Sylgard 184™ from DOW CORNING™ of Midland, Mich.) using soft lithography methods. PDMS is widely used for fabrication of microfluidic devices; it is inexpensive and it can be fashioned to have complex channel structures. Master molds for the devices were created by spin-coating a clean silicon wafer with negative photoresist (SU-8 25™ from MICROCHEM™ of Newton, Mass.). High-resolution photomasks (10,000 dpi, CAD ART SERVICES™ of Bandon, Oreg.) were then used to selectively expose the coated wafers to UV light, thus creating the desired patterns. Following treatment with SU-8 developer (MICROCHEM), the wafers were flood exposed to UV light and baked. A profilometer (DEKTAK™ from VEECO INSTRUMENTS INC.™ of Plainview, N.Y.) was used to determine the heights of features located on the left, right, and center portions of the wafer. The wafers were then treated with a fluorosilane ((tridecafluoro-1,1,2,2-tetrahydrooctyl)-1-trichlorosilane, UNITED CHEMICAL TECHNOLOGIES, INC.™ of Bristol, Pa.) under vacuum for 60 min. PDMS pre-polymers (10 parts base, 1 part curing agent) were poured over the molds to a depth of 5 mm and allowed to cure in an oven at 65° C. for 12 hours. Individual channel designs were cut from the mold with a scalpel. Inlet and outlet holes were punched with blunt 15-gauge luer stub adapters (CLAY ADAMS™ from BD™ of Franklin Lakes, N.J.). The devices were then rinsed with water and ethanol, dried with Ar gas, placed channel-side down on PDMS-coated slides, and baked in an oven at 65° C. for 5 hours. Channels used for particle synthesis had heights between 37.4 and 39.9 μm, while those used for particle flowing were between 38.2 and 38.6 μm in height.

Hydrogel microparticles were photo-polymerized at rates up to 18,000 particles per hour with 75 millisecond (ms, 1 ms=$10^{-3}$ seconds) ultraviolet (UV) exposures using the stop-flow lithography (SFL) method. A power meter (Model 1815-C from NEWPORT CORPORATION™ of Irvine, Calif.) and appropriate adjustment of the UV lamp strength were used to ensure a consistent UV intensity (0.8 μW $mm^2$) during the course of the experiments. This step was taken to avoid unexpected variations in polymerization extent due to the intensity changes over the lifetime of the mercury bulb. Microfluidic devices with one to four inlets were connected to a compressed air source by Tygon tubing with modified 10 and 200 μl pipette tips (BioSciences from LIFESPAN™ of Seattle, Wash.) attached to one end.

Two different pre-polymer solutions, "DA20" and "DA30", were used in the course of the experiments; the composition of each is given in Table 1. Pre-polymer solutions were mixed 9:1 with 1×TE to mimic the monomer

TABLE 1

Composition by volume of pre-polymers used in particle synthesis.

| Constituent | DA 20 | DA 30 |
|---|---|---|
| Poly(ethylene glycol) (700) diacrylate (PEG-DA) | 20% | 30% |
| Poly(ethylene glycol) (200) (PEG) | 40% | 30% |
| 3X TE buffer | 35% | 35% |
| Darocur 1173 photoinitiator | 5% | 5% |

formulation used in previous nucleic acid detection experiments. When synthesizing particles with multiple chemistries, food coloring was added to the DA30 at 2% of the final monomer solution volume to create a contrast difference that could be exploited for stream visualization in the synthesis process using a charge couple device (CCD) camera (KP-M1A from HITACHI™ of Tokyo, Japan). Atomic force microscopy (AFM) was used to determine the elastic moduli of particles synthesized with DA20 and DA30.

Particles were flushed down the synthesis channel and collected in a 0.6 μl Eppendorf tube filled with 300 μl of TET (1×TE with 0.05 vol % Tween-20 surfactant from SIGMA ALDRICH™ St. Louis, Mo.). TE is a common buffer solution that consists of Tris (pH buffer) and EDTA (chelating agent) and is often used to prevent the degradation of nucleic acids by limiting the efficacy of nucleases. 100×TE is obtained from EMD CHEMICALS INC.™ of San Diego, Calif. and then dilute to 1× with DI water. TET was then used to rinse the particles of un-reacted monomer as well as PEG and food coloring in a series of five washing steps that involved manual aspiration facilitated by centrifugal separation of the dense particles. Particles were stored in TET at final concentrations of about 10 particles per micro liter (μl, 1 ml=$10^{-6}$ liters) in a refrigerator (at 4° C.). Unless otherwise noted, particle dimensions cited herein refer to the size expected from the transparency mask used. The length of each dimension could be up to 4% greater for particles made from DA20 due to swelling.

The tablet-shaped hydrogel particles in these example embodiments are substantially larger (about 250 microns long by about 80 microns wide by about 35 microns thick) and more flexible than latex microspheres commonly used in other suspension arrays. Pressure-driven flow is used to carry the particles through rectangular cross-section PDMS channels, while sets of side streams called focus fluid channels and abrupt contractions in width at junctions serve to orient the particles prior to their entrance into a narrow "detection zone," as described above. After exposure to a sample with one type of target molecules, the particles are rinsed and suspended in PTET carrier fluid (5×TET with 25% by volume PEG (400)), e.g., during step 709 above, for introduction into the particle focusing device.

Particle Focusing Device Operation.

Figure 14:
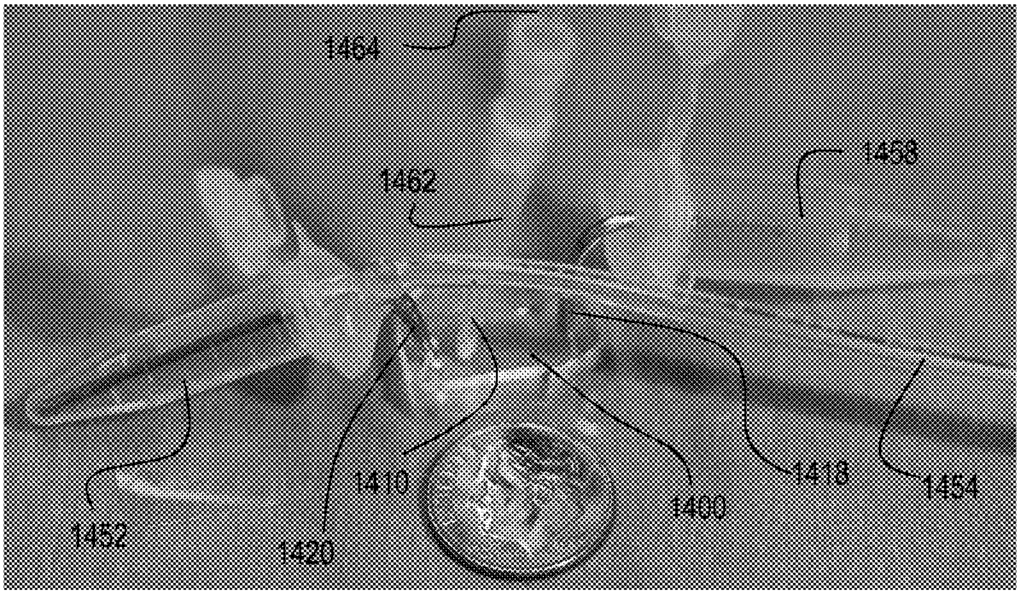
FIG. 14 is a photo of a microfluidics device in operation, according to an embodiment.

Particle focusing devices (also called flow devices herein) with two inlets and one outlet were used for all experimental embodiments. Different candidate particles were never mixed together; each flow trial consisted of particles of identical shape and composition. FIG. 14 is a photo of a microfluidics device 1400 in operation, according to an embodiment. A focus fluid reservoir container 1452 is connected to focus fluid inlet chamber 520 using metal tubing 1420. Similarly a fluid collection container 1458 is connected to fluid outlet chamber 518 using metal tubing 1418. A sample mixture reservoir container 1462 is connected to sample mixture inlet chamber 510. Tube 1454 is connected to one pressure source to drive the focus fluid through the device 1400; and tube 1464 is connected to an independent pressure source to drive the sample mixture through the device 1400.

Prior to being loaded into the flow device, particles were removed from the refrigerator, rinsed 4 times in PTET, and allowed to sit at room temperature for 90 min. PTET was used to obtain better density-matching between the particles and the liquid medium in order to minimize the effects of sedimentation in the loading process. The PTET was subjected to sonic agitation (i.e., "sonicated") for 1 minute before use to eliminate polymer agglomerations that could disrupt particle flow. Once the particles were diluted to the appropriate concentration (10 to 20 particles per μl) with PTET, 20 to 30 μl of the mixture was loaded into a pipette-capped 1462 length of Tygon tubing 1464. The pipette was then inserted into sample mixture inlet 510. A modified Eppendorf tube 1452 containing a 2% solution of food coloring in PTET was connected to focus fluid inlet 520 via metal tubing 1420. Tygon tubing 1454 was inserted through a hole in the Eppendorf cap to provide driving pressure. The tubing 1454 and 1464 from the inlets was then attached to two separate pressure regulators (Omega) to provide independent control over the two streams.

Particle focusing devices (e.g., device 1400) were able to be reused up to 50 times without any decrease in performance. The compressed air source used to drive the flows was a plastic canister with a hand pump. Upon sufficient pumping, a two-way valve connecting the canister with the regulators was opened, thereby inducing flow. Pressures of 9 pounds per square inch (psi) were able to be maintained for more than a minute using this simple setup.

Theoretical Considerations

In a rectangular channel with a high cross-sectional aspect ratio, it is expected that a parabolic velocity distribution will develop along the small dimension. This flow profile can inhibit the performance of flow measurement devices (called cytometers) for biological cell-sized particles by generating non-uniform particle velocities. Although the short dimension can be further reduced to physically confine the particles, this lowers flow velocity and throughput. Higher driving pressures can be used to counteract this decrease in some embodiments, but such an approach may lead to deformation of the channel and/or the particles. While the velocity distribution in the longer cross-sectional dimension (called channel width) is nearly uniform in the center of the channel, large gradients develop in a boundary layer near the side walls of the channel. Particles passing through this layer will be slowed significantly. It has previously been shown that rapid decreases of channel cross-section can enhance the focusing of deformable blood cells by introducing regions of high shear adjacent to the walls that produce strong hydrodynamic lift forces. However, it is not apparent that the tablet shaped particles will respond similarly as such disc-shaped cells to such contractions.

As described above and demonstrated below, focusing streams from focus fluid channels and multiple contractions in channel width are used in the illustrated embodiments to disturb the developed flow along the walls and eject particles into the center flow region for better performance in cytometers. The following theoretical considerations are presented to more thoroughly explain some of the embodiments. However, the embodiments are not limited by the completeness or accuracy of these theoretical considerations.

For flexible bodies like blood cells that deform at constant volume and surface area, it was found that the pressure in the thin "height gaps" above and below the body (e.g., see FIG. 2) are uniform. Small deformations in the body height were shown to produce a gap distance that varied with spanwise (y) position only; the gap distance was constant along lines parallel to the flow. Blood cell velocity was predicted to be much less than that of the bulk fluid for channels with small height gaps and with channel widths (also called span herein) much larger than cell width. This effect can be attributed to the ability of the fluid to easily bypass the cell by moving through the relatively large "side gaps." In contrast, for tightly fitting bodies in cylindrical tubes, the driving pressure is concentrated across the particle, leading to bulk fluid velocities that are lower than body velocities and even leading to "leakback" of fluid in the opposite direction.

For the narrow detection portions of the channel (e.g., central channel portion 512*e* or 612*g*), a lubrication approximation is utilized to determine the lift forces on the particle that arise from the bypass flow in the side gaps just described. This analysis is used to rationally support the discovered design for both the particle and the channel that gave rise to forces and torques that most effectively position and align the particle for proper scanning.

In a reference frame moving with the particle, the fluid velocity and pressure drop in the side gap are given by Equation 1 and Equation 2.

$$v_x(x, y) = \frac{y}{2\mu}\frac{dP}{dx}(y - h(x)) + U_w\left(\frac{y}{h(x)} - 1\right) \quad (1)$$

$$\frac{dP}{dx} = -\frac{12\mu q}{h(x)^3} - \frac{6\mu U_w}{h(x)^2} \quad (2a)$$

where μ is the dynamic viscosity, P is the dynamic pressure, $U_w$ is the wall velocity, and q is the volumetric flow rate per unit width. As shown in FIG. 3A, y represents the spanwise distance across the width of the channel, x the distance along the channel, α the deflection of the particle from a line parallel to the channel, and h(x) the side gap as a function of x. The geometric and dynamic criteria required for application of the lubrication analysis are expressed by the inequalities 2a and 2b.

$$\tan\alpha \ll 1 \quad (2b)$$

and $$(q/\nu)\tan\alpha \ll 1. \quad (2c)$$

Neglecting deformation and any three-dimensional effects from flow in the height gap, these conditions are met by the nearly unidirectional bypass flow established in the side gaps when an oblong particle is passing through the relatively narrow regions of the channel at small a. In analyzing the stress exerted by the fluid on a rigid particle surface, the normal viscous stresses are zero, and the components of the stress vector S are thus given by Equation 3 and Equation 4.

$$s_x = -\frac{dh}{dx}P - \mu\frac{\partial v_x}{\partial y} \quad (3)$$

$$s_y = P. \quad (4)$$

The torque tensor G (per unit width) about a position at the center of a trailing edge of the particle, given by the vector $r_0$, can be calculated approximately as given by Equation 5.

$$G = \int_{x_1}^{x_2} (r - r_0) \times s(n) dx. \quad (5)$$

Where r is a position vector for a point on the surface of the particle, n is a vector normal to the particle surface, and S is the stress vector. The torque was calculated about $r_0$ because high-speed videos of poorly aligned particles in the upstream portion of the detection region were observed to most often rotate about this point in their movement into a properly aligned orientation. For all calculations with this lubrication approximation, the effect of the upper gap was modeled in an analogous fashion to that just described for the lower gap and the contributions summed for the determination of the total force and torque. The primary difference between the two situations is that the lower gap involved a contraction while the upper gap involved a symmetric expansion.

Upon entrance into the detection region of the central channel in the example embodiments, the observed angle of deflection, θ, for a typical particle is between 0° and 5°, thereby giving a maximum value of 0.087 for tan θ and satisfying the geometric requirement for lubrication approximation. Meanwhile, based on a typical volumetric flow rate per width, q, of $2\times10^{-5}$ meters squared per second ($m^2s^{-1}$) and a kinematic viscosity, υ, of $1\times10^{-5}$ $m^2s^{-1}$ for the PTET carrier fluid, the q/υ factor in Equation 2a has a value of 2; and thus the maximum value of the center expression in Equation 2a is 0.174. These values suggest that the use of the lubrication approximation is indeed valid within this side gap region of the detection zone of the central channel in the example embodiments.

For the wider portions of the channel (e.g., central channel portions upstream of channel portion 512*c* or upstream of channel portion 612*g*), the rotational and translational tendencies of particles are better understood by the principle of gradient minimization, which dictates that the oblong particles will tend to rotate until the velocity gradient across their rear surface can no longer be reduced. For rectangular particles with high aspect ratios, this condition is met once the short and long dimensions have been oriented perpendicular and parallel, respectively, to the flow direction. The large particles used in the example embodiments are expected to impact the time scale of this orientation process by altering local velocity profiles and generating significant wake flows in areas of high particle concentration.

Alignment Testing Procedures.

The capability of a particle focusing apparatus to align hydrogel particles for scanning was tested by imaging various embodiments of the particles in the detection zone of various embodiments of the particle focusing device. Once the properties of a particular flow device are determined, it is anticipated that the device would be deployed with a narrow window scanner (as depicted in FIG. 3A) and not with a more complex imaging system as described next for testing the device.

To accomplish testing, flow devices were mounted on an inverted microscope (TE2000U, Nikon) for visualization with 10× and 4× objectives. A high-speed Phantom camera (Vision Research) captured images at rates ranging from 4,000 to 15,000 frames per second (fps). Still images from the movies were analyzed using Phantom Cine Viewer software (2.24 microns per pixel for 10×, and 12.44 microns per pixel for 4×). Particle velocities were calculated in the detection zone by measuring the time required for a fixed point on the particle to move a known distance in the channel. Detection zone measurements of velocity, position, and alignment were always made 750 microns upstream of the outlet chamber (e.g., outlet chamber 518) to ensure consistency.

A "successful" scan was defined to be one in which the horizontal distance between the centers of any two holes in a given column of the encoded portion was less than 5 microns. In addition, particles with any measurable lateral (y-direction) drift from the center of the channel in the detection zone were deemed "unsuccessful" passages. This conservative definition of success is based on properties of a scanner expected to be used during normal operations, e.g., a photomultiplier tube (PMT) with a sampling rate of one MegaHertz (MHz, 1 MHz=$10^6$ Hertz, Hz, 1 Hz=1 sample per second) and an excitation beam width of about 1 micron to about 10 microns. Quoted throughput values include both successful and unsuccessful particles, and unless otherwise noted, each flow trial involved the imaging of 100 particles.

Experimental Embodiments

To separate the contributions of particle composition, channel design, and device operation, several experimental embodiments were constructed and tested using the procedures or theories described above. In a first set of embodiments, a canonical hydrogel particle was used under a variety of operating conditions and channel designs to determine how to minimize clogging and disruptive particle-particle interactions in the detection zone. In another set of experimental embodiments, hydrogel particle size, shape and composition were varied to demonstrate the impact of those particle properties on alignment tendency and mechanical stability in a particular particle focusing apparatus. In yet another set of experimental embodiments, methods of operating a particle focusing device with a revised hydrogel particle design suitable for bioassays were determined to balance high throughput and success rate with maintaining a high degree of reproducibility.

Example Particle Focusing Devices.

Embodiments with different detection-zone width (Wd), number (N) of junctions, junction spacing (Lf), and forcing pressures were implemented for a fixed canonical particle design. The canonical particles were photo-polymerized from DA20 pre-polymer, had dimensions of roughly 270 by 90 by 33 microns, and featured 10 by 10 micron holes spread evenly throughout the particle. The composition was selected based on earlier work; while the hole design was chosen for its symmetry and for its use in alignment measurements. Sample mixture loading concentration was fixed at 10 particles per µl.

Initial trials were performed with a simple channel design with one pair of focus fluid channels impinging at one junction ("1-junction device," N=1) as presented in previous related work (Doyle I). The focus fluid that flows along each wall of the central channel downstream of the junction is called a "side flow," "side stream," "sheath flow," or "sheath stream." The central channel decreased in width from 500 to 100 microns at the junction, producing a large velocity gradient in the flow direction. The detection zone was 2.3 mm in length, with Wd=100 microns. The forcing pressures of the particle and sheath streams were matched, and they varied between 4 and 9 psi. Average particle velocities for this pressure range were between 10 and 30 centimeters per second (cm/s, 1 cm=$10^{-2}$ meters). Image analysis of the detection region revealed a tendency for particles to appear in clusters with poor alignment and slight deformations of the leading and trailing particle edges. Moreover, flow in the channel would temporarily decrease at times, producing wild variations in particle velocities over short periods of time.

These observations implied that the particles were jamming at the contraction point of the channel. Subsequent investigation of this region revealed sporadic instances in which groups of 2 to 5 particles traveled closely together and lodged tightly in the contraction zone, thus impeding flow and leading to an accumulation and compression of particles. After 100 to 1000 milliseconds (ms), the flexible hydrogel particles would eventually squeeze past one another and eliminate the blockage—producing clumps observed further downstream. It should be noted that the deformations were elastic and the clogging never led to permanent (plastic) deformation. Particles collected in an exit reservoir did not exhibit any substantial structural abnormalities.

Various subsequent embodiments included devices with 2 junctions and 3 junctions, with Wd=100 microns and Lf=400 microns. The frequency and duration of the blockage events were reduced, but only by small amounts. Video imaging of the flow patterns in the 500 micron wide portion of the central channel of the device with one junction revealed a tendency for some particles to travel slowly along channel walls. Such behavior is consistent with the flow profile of a channel with a high aspect ratio, as discussed earlier. When the same observations were made in the 500 micron wide portions of the central channel for the 2- and 3-junction devices, the "wall-huggers" in these channels were reliably coerced off the wall prior to the detection zone by the local velocity increase created by the impinging side streams.

It was postulated that increasing Lf from 400 to 1000 microns would better enable particles to adopt a lengthwise flow orientation prior to the junctions. This was based on the belief that rotation into the lengthwise orientation arose from a tendency for the particle to minimize the velocity gradient of the flow impinging upon it. The disordered flow patterns in the wakes of particles severely limited this effect, making congested areas less likely to produce well-aligned particles. Embodiments with larger Lf seemed to confirm this hypothesis. Based on observations of both upstream and detection zones, the longer residence time of the particles in the wide portions led to a nearly complete elimination of blockage events and elimination of drastic velocity variations in the embodiment with 3-junctions and Lf=1000 microns. Thus for particle lengths of 270 microns, junction spacing greater than 400 microns, such as 1000 microns, is advantageous. Note that 400 microns is less than 540 microns (twice the particle length) and 1000 microns is greater. Thus these embodiments show it is advantageous to have junction spacing of greater than about twice the particle length.

The above embodiment included detection zone width (Wd) of 100 microns and particles widths (W) of 90 microns. Even though clustering and velocity fluctuations were eliminated by increasing Lf, particle deformations were observed, especially at higher forcing pressures. Particles approaching the final width contraction from 200 microns to 100 microns in the 3-junction device were seen to distort violently if the particle approached the contraction from a position far from a centerline of the channel. Furthermore, the small side gap between the particle and channel walls (5 microns on each side) led to a large pressure drop across the particle length and introduced substantial lift forces that compressed the particle in the direction perpendicular to flow and elongated it in the direction parallel to flow (about 10% increase in length).

Increasing detection zone widths Wd to 150 microns did not eliminate the deformations. FIG. 8A through FIG. 8D are images of hydrogel particles in a detection zone, according to various embodiments of the particle. Scale bar 802 in all images is 50 microns long. Each embodiment involved a particle made of DA 20 with the whole length covered in coding holes. Each image shows an example of a failure of the particle to be aligned properly for accurate detection in a narrow scanning window. FIG. 8A illustrates a failure mode of a 190 micron long by 90 micron wide particle 810 (with aspect ratio, AR,=2.11) with poor alignment. FIG. 8B, FIG. 8C and FIG. 8D illustrate failure modes of three 270 micron long by 90 micron wide particles 820, 830, 840, respectively (AR=3.00) with drastic deformations that would preclude reading of the barcode.

It was determined that embodiments with detection zone channel widths Wd roughly twice as wide as the particle width would suffer fewer particle deformations. It is believed that this is due to increasing bypass flow and lowering the pressure drop.

These embodiments of the particle focusing device indicate that it is advantageous to use multiple sets of side streams (i.e., multiple junctions) to constrict the central channel to the detection zone width, to separate the junctions by a sufficient distance (e.g., more than about two particle lengths), as well as to have a detection zone width that permits substantial bypass flow (e.g., about twice the particle width) for shape preservation, alone or in some combination.

Particle Properties.

An embodiment of a particle focusing device called the canonical flow device was used for different embodiments of the hydrogel particle. The canonical flow device included 3-junctions with Lf=1000 microns and Wd=150 microns. All embodiments for using the device described in this section were performed with a pressure of 9 psi for both inlets, leading to particle velocities of 25 to 35 cm/s.

The alignment of the tablet-shaped (e.g., rounded rectangle) particles observed in initial experiments was far more reliable than that of additional morphologies that were also investigated (oblong particles with pointed ends, as well as tear-drop and bullet shapes). Thus different embodiments of the tablet-shaped particles are described in this section.

The effect of particle aspect ratio (AR) was explored by flowing 90 micron wide particles (DA20 composition) with four different lengths: 190, 230, 270, and 310 microns. Flow trials involved measuring the lateral position and success rate of 100 particles of each aspect ratio and the results listed in Table 2a and Table 2b for DA20 particles and DA30 particles, respectively.

TABLE 2a

Effect of AR on DA20 particles in device with N = 3, Wd = 150 microns

| Aspect ratio | Success rate | Mean dist from centerline (microns) | Main failure mode |
|---|---|---|---|
| 2.11 | 91% | 4.5 | Lateral movement |
| 2.56 | 95% | 2.6 | Front deformation |
| 3 | 82% | 3.2 | Front/back deformation |
| 3.44 | 99% | 1.4 | None |

TABLE 2b

Effect of AR on DA30 particles in device with N = 3, Wd = 150 microns

| Aspect ratio | Success rate | Mean dist from centerline (microns) | Main failure mode |
|---|---|---|---|
| 2.11 | 82% | 9.2 | Lateral movement |
| 2.56 | 94% | 6.9 | Lateral movement |
| 3 | 88% | 6.5 | Poor alignment |
| 3.44 | 100% | 3.6 | None |

The position was calculated as the distance from the center of the particle to the centerline of the channel. It was observed that several of the shortest particles, AR=2.11, exhibited significant lateral movement and had slanted front and rear edges upon reaching the detection zone (FIG. 8A). Particles with AR=2.56 flowed more closely along the centerline of the channel and with virtually no lateral movement, but several had leading edges that were slightly blurred or compressed at driving pressures of 9 psi. Particles with AR=3.00 exhibited drastic deformations (FIG. 8B to FIG. 8D), leading to the lowest success rate of the four particle types. In many instances, the front edge of the particle was bent towards one of the walls, thereby disrupting the alignment of the holes in the code region. Several particles (10%) with this AR also exhibited curved side walls. The particles with AR=3.44 suffered from none of the problems that plagued the other designs. The sole failure in this trial was one particle that was twisted into a U-shape. It is believed that this is due to a detection zone width Wd=150 microns less than twice (180 microns) the particle width (90 microns).

The results of the trials with these embodiments of the particles suggested two potential sources of failure. One source, at low AR, is a reduced tendency to orient into and maintain a flow alignment that was conducive to scanning. As discussed earlier, the generation of lateral forces in the small side gap between the channel wall and the particle edge will tend to rotate the particle into an orientation such that the major axis of the particle is aligned with the centerline of the channel. This effect becomes more pronounced as the particle length-to-channel width ratio (represented by the symbol b) becomes larger. Longer particles experience a larger net torque, and smaller side gaps generate greater lift. Another source, at more moderate AR, is a higher susceptibility to deformations of a leading edge. A visual inspection of the images of the particles entering the final contraction in the 3-junction device revealed that many of the particles of mid-range AR were poorly oriented and thus forced to bend significantly to enter the more narrow detection width. In contrast, particles with the lowest AR appeared to resist such deformation and were able to enter with imperfect alignment due to their smaller size. Particles with the highest AR were already aligned sufficiently so that they did not experience distortion upon their entrance into the narrow channel of the detection zone.

It is well known that the mechanical strength of a hydrogel depends to a great extent on the number and nature of the cross-links present. By using a pre-polymer with a higher proportion of a cross-linking active monomer agent (PEG-DA), it was found to be possible to generate hydrogel particles with higher cross-linking densities that are more resistant to deformation. The AR study was thus repeated with embodiments of particles polymerized from DA30 pre-polymer to investigate effects on flow characteristics (Table 2b).

From atomic force microscopy (AFM) measurements on particle regions without coding holes, the elastic modulus of the DA20 hydrogel was found to be 10.1±0.4 kilo Pascals (kPa, 1 kPa=$10^3$ Pascals, 1 Pascal=1 Newton per square meter), while that of the DA30 hydrogel was found to be 19.6±1.2 kPa. The impact of the added rigidity of the DA30 particles was noticeable, with significantly less deformation at all values of AR. DA30 particles did not exhibit the bent leading edges, curved side walls, or compressions that plagued the more flexible DA20 particles. Images of the final contraction revealed particles with no perceptible shape changes, in sharp contrast to the DA20 embodiments.

Atomic force microscopy (AFM, AGILENT TECHNOLOGY™ of Santa Clara Calif.) was incorporated within an optical microscope (IX 81 from OLYMPUS CORPORATION™ of Tokyo, Japan) to enable positioning of AFM cantilevered probes above particle samples. Calibration of AFM cantilevers of nominal spring constant k=0.01 nanoNewtons per nanometer (nN per nm, 1 nN=10 Newtons, 1 nm=$10^{-9}$ meters) and probe radius R=25 nm (Veeco) was conducted. Briefly, inverse optical lever sensitivity in nm per Volt (InvOLS) was measured from deflection-displacement curves recorded on rigid glass substrates. For each measurement of elastic moduli, at least 25 replicate indentations were acquired to maximum depths of 20 nm. Acquired probe deflection-displacement responses were converted to force-depth responses using measured spring constants and InvOLS (Scanning Probe Imaging Processor from IMAGE METROLOGY™ of Hørsholm, Denmark). Elastic moduli, E, were calculated by applying a modified Hertzian model of spherical contact to the loading segment of the force-depth response with the scientific computing software Igor Pro (WAVEMETRICS™ of Lake Oswego, Oreg.).

While the higher cross-linking density solved one flow problem, it seemed to exacerbate the other. The stiffening of DA30 particles with ARs of 2.11 and 2.56 led to an increase in poorly aligned particles that were also more susceptible to moving laterally in the detection zone. FIG. 9 is a graph 900 that illustrates dependence of microparticle position in a microfluidics channel on particle composition, according to various embodiments. The horizontal axis 902 is particle length L in microns. The vertical axis 904 is lateral position of particle measured from the center of the channel span in microns. The particle width is fixed at 90 microns. Each plotted point represents an average of 100 particles, and all measurements were made from channel centerline to the central most point of the particle. The diamonds 910 represent DA20 values and the squares 920 the DA30 values. At all lengths, the softer DA20 particles 920 exhibit superior positioning and a reduced tendency to move laterally. Longer particles are observed to settle into stable flow trajectories closer to the centerline than shorter particles.

The use of DA30 raised the success rates of the two higher ARs, but actually led to a decrease in the success rates of the two lower ARs. In the case of DA30 particles with ARs of 2.11 and 2.56, the additional rigidity arising from higher cross-link density, when combined with the compact morphology, leads to a regime of rigid-body motion within the channel. This effectively eliminates the temporary hydrogel deformations induced by the surrounding focusing flow that play a significant role in coercing the particle into the preferred position and alignment. Any attempt to tune the flow behavior with this design parameter must balance the desire for structural integrity with the need for efficient focusing and orientation by hydrodynamic forces. Thus, the particle embodiments with a high aspect ratio and a stiff gel network have advantages over embodiments with lower aspect ratio.

Bifunctional Embodiments

The channel and particle embodiments with the better observed performance characteristics were refined and combined to create embodiments of a flow-through system that could be operated reliably at high-throughput with hydrogel designs that were capable of extracting and displaying information from bioassays.

Three different particle focusing device embodiments (A, B, C) were used, each with $L_f$=1000 μm, as listed in Table 3.

TABLE 3

Three particle focusing device embodiments

| Name | Wd (μm) | junctions, N | Upstream widths (μm) |
|---|---|---|---|
| A | 100 | 4 | 450, 350, 250, 150, 100 |
| B | 125 | 4 | 450, 350, 250, 150, 125 |
| C | 150 | 3 | 450, 350, 250, 150 |

Various embodiments of the hydrogel particle with different shapes and compositions were tested to find a combination that more often resulted in proper alignment, durability in high-velocity flows, and compatibility with bioassays. Using new masks and stop flow lithography (SFL), 9 micron by 9 micron holes were limited to one half of the particle, thus creating a "probe" portion and an "encoded" portion (e.g., FIG. 1), also called regions. Columns and rows of holes were separated by 9 microns. This design allows the capture and quantification of target(s) on one end and the display of code associated with probe identity on the other (see, Doyle I). To create "bifunctional" particles, the code region was polymerized from DA30 to ensure mechanical stability, while the probe region was polymerized from DA20 to produce a pore size consistent with that featured on particles employed in high-sensitivity assays in previous work (e.g., Doyle I). Furthermore, the use of DA20 imparted a flexibility that would aid in orientation within the channel, as seen in the earlier particle study. The new particles were 235 microns long by 65 microns wide by 35 microns thick, and featured a redesigned hole setup capable of 3,072 distinct codes. The AR of this hydrogel particle embodiment (3.62) was higher than any used in previous embodiments. The narrower width also permitted the detection zone widths of device embodiments B and C (Wd=125, 150, respectively) to satisfy the desirable condition that the detection zone channel width be about twice the particle width.

Figure 10:
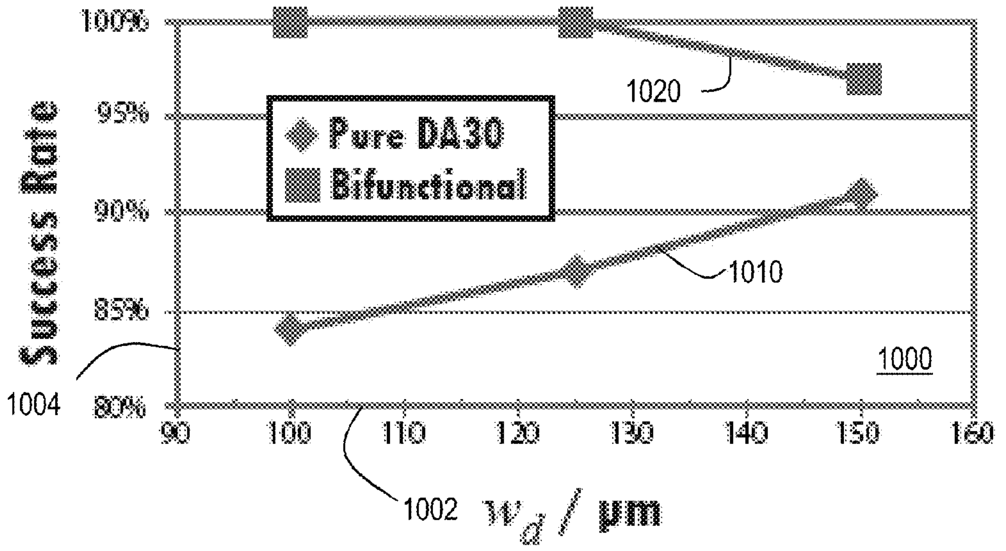
FIG. 10 is a graph that illustrates dependence of microparticle detection in a microfluidics channel on particle composition, according to various embodiments.

Bifunctional particles were flowed through the three device embodiments at loading concentrations of 10 particles per μl; and performance was compared to that of particles with probe and code regions both synthesized from DA30. Higher success rates were recorded for the bifunctional particles in all three channels. FIG. 10 is a graph 1000 that illustrates dependence of microparticle detection in a microfluidics channel on particle composition, according to various embodiments. The horizontal axis 1002 indicates detection zone width in microns. The vertical axis 1004 indicates success rate in percent. Data is collected at three increasing values of Wd, corresponding to the three device embodiments A, B and C, respectively. The trace connecting diamonds 1010 indicates the results for pure DA30 particles, while the trace connecting squares 1020 indicates the results for the bifunctional particles.

Bifunctional particles also flowed more closely along the centerline than their pure DA30 counterparts in all channel types, with the best positioning achieved in design C. With the encoded portion only occupying about half of the particle length, a preference for "probe-first" flow was observed, with 91% of bifunctional and 79% of pure DA30 particles doing so. In addition, higher velocities (from about 35 cm/s to about 60 cm/s) were recorded for these slender particles of 65 micron width. Compared to the previously used 90 micron wide embodiments, the 65 micron wide embodiments, closer to half the detection zone width Wd, provided larger side gaps that effectively reduced the pressure drop across the particle, thereby diminishing the tendency to deform in the detection region. For the 600 total hydrogel particles analyzed, probe-first particles traveled about 10% faster than code-first particles, with a larger difference being measured for the pure DA30 design.

The effect of hole spacing was investigated, again using the same three particle focusing device embodiments. Seeking to increase throughput, the loading concentration was increased from 10 to 15 particles per μl for these embodiments. Bifunctional particle embodiments with column spacing of 9, 7, and 5 microns were studied (all row spacing remained at 9 microns). Shorter column spacing reduces the particle area needed for coding and thus increases the area available for probe immobilization. However, the desire to minimize the code area is advantageously balanced by the desire to maintain structural integrity. Nine trials with bifunctional particle embodiments having three different hole spacing in the three channels revealed a noticeable reduction in success rate for holes with 5-μm spacing. For the 900 hydrogel particles studied, the average success rates of the 9 micron spading, 7 micron spacing, and 5 micron spacing were 97%, 99%, and 88%, respectively. Most failures of the smallest spacing were due to large compressions of holes in particles traveling code-first. Mean throughput at the higher loading concentration was 29 particles/s; while mean velocity was 51 cm/s.

The high success rates achieved in device embodiments B and C (100% and 99%, respectively) with 7 micron hole spacing were explored further by conducting additional trials. Five new batches of bifunctional particles with the 7 micron hole spacing were synthesized, and five devices of each embodiment were constructed. To investigate the reproducibility of the earlier results, each batch was sent through one of the five sets of devices (i.e., batch 1 through B-1 and C-1, batch 2 through B-2 and C-2, etc.) at a loading concentration of 15 particles per μl. The results of these trials (first rows of Table 4) indicated a high degree of repeatability, including inter-trial coefficients of variance (COV) less than 4% for the mean velocity, as well as mean success rates over 99%.

TABLE 4

Particle alignment results for various device embodiments and loading concentrations.

| Loading (particles/μl) | Device | Trials | Mean success rate | Mean through-put ($s^{-1}$) | Mean velocity (cm/s) | Intertrial velocity COV | Probe-first |
|---|---|---|---|---|---|---|---|
| 15 | B | 5 | 99.80% | 30.2 | 46.3 | 3.29% | 84.40% |
| | C | 5 | 99.20% | 24.9 | 35 | 3.91 | 84.60% |
| 17.5 | B | 5 | 98.40% | 40.2 | 48.1 | 2.02% | 75.60% |
| | C | 5 | 98.80% | 35.4 | 35.4 | 1.44 | 79.80% |
| 20 | B | 1 | 92% | 47.4 | 50.8 | NA | 86% |
| | C | 1 | 91% | 40.3 | 38.5 | NA | 71% |

Figure 11:
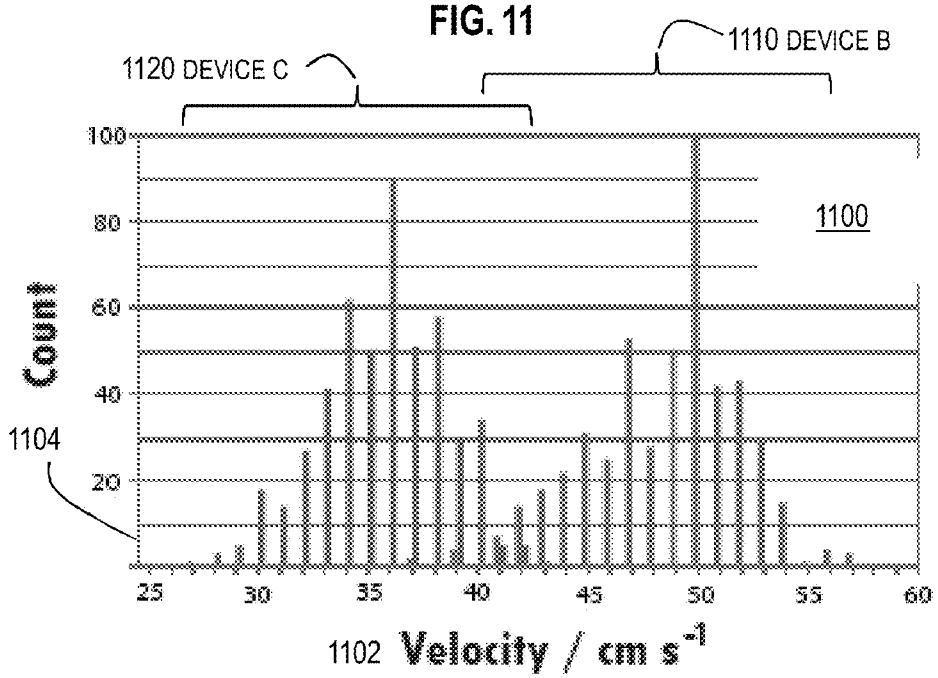
FIG. 11 is a graph that illustrates distribution of microparticle speeds in different microfluidics channels, according to various embodiments.

FIG. 11 is a graph 1100 that illustrates distribution of microparticle speeds in different microfluidics channels, according to various embodiments. Graph 1100 is a histogram of detection-zone velocities of 1,000 bifunctional particles in devices B and C. The horizontal axis 1102 indicates velocity bins in cm/s with 1 cm/s resolution; and the vertical axis 1104 indicates the number of particles observed traveling within a particular velocity bin. The speeds observed in device embodiment B are substantially faster than those observed in device embodiment C. The small spread of velocities for each device indicates a high degree of order and repeatability. Results are compared from trials run in five B and five C devices with five different particle batches. The tails on the left side of each spike can be attributed to the small percentage (about 15% to about 20%) of particles that flowed "code-first." For the bifunctional design, these particles were typically 10% slower than their probe-first counterparts. This uniformity of particle speed is advantageous for high-fidelity signal analysis; and signifies the establishment of well-ordered flows with minimal particle-particle interactions. As in earlier trials, particles preferentially adopted a probe-first orientation by the time they had entered the detection zone, with 76% flowing in this manner in device embodiment B compared to 80% in device embodiment C.

In order to maximize throughput, an attempt was made to determine higher loading concentration that could still produce well-ordered, single-file flows. A reproducibility study similar to the one just described was conducted at a loading concentration of 17.5 particles/μl. Once again, a high degree of repeatability was achieved, as shown in Table 4, with a minor success-rate decrease that was outweighed by a noticeable increase in mean throughput. As in the previous study, device embodiment B performed slightly better, with a higher mean throughput. Trials were then performed at a loading concentration of 20 particles/μl. At this concentration, a more significant drop-off in the success rate occurred, as shown in Table 4, with crowding in the channel significantly disrupting the upstream focusing and even leading to the partial overlap of particles in the detection region. It was concluded that the increase in throughput at 20 particles/μl was not worth the decrease in success rate, and a preferred loading concentration was determined to be 17.5 particles/μl.

The hydrodynamic forces acting on the encoded particles in the detection region of device B were explored by applying Equations 1 through 5 to the nearly unidirectional side-gap flow to determine the torque involved in lengthwise alignment. COMSOL Multiphysics' Incompressible Navier Stokes module was used to model the two dimensional (2-D) fluid flow in the microfluidic device embodiments for particle focusing. For all simulations, a stationary nonlinear solver was used with the Direct (UMFPACK) linear system solver. Relative tolerance for the solver was at least $1.0\times10^{-4}$ for all converged flow profiles, and high mesh densities were used to increase resolution in areas of particular interest. Based on a "full-device" simulation without particles present, it was determined that devices with Wd=125 microns and N=4 had a mean fluid velocity of 6.79 m/s at the point of particle measurement in the detection region. This full-device simulation specified no-slip boundary conditions at all walls of the channel except the inlet port (normal pressure condition set at 9 psi) and the outlet port (neutral condition set). With a channel Reynolds number defined as $Re_c = U\,Dh/\upsilon$ (U is mean flow velocity, Dh is hydraulic diameter of channel, υ is kinematic viscosity of fluid), these simulations demonstrate that $Re_c \approx 40$ for typical detection-zone geometries.

The same module was also utilized for the study of hydrodynamic forces on particles in the detection region of the channel. Using pressure estimates from the full-device simulation, flow profiles were solved for a 1.5 psi drop across a 700 micron long detection zone with Wd=125 microns, which contained a single particle with various values of $\theta=-\alpha$ No-slip boundary conditions were set at the two side walls, a normal pressure condition was set at the inlet, and a neutral condition was set at the outlet. In addition, a normal flow velocity condition was set at the boundary of the particle to match the typical velocity of the particles in the detection region (50 cm/s). To determine the forces acting on the particle surface, the post-processing feature of software from COMSOL™ of Burlington, Mass. was used to export data on drag and lift forces at each point of the line segments used to model the particle. This data was then combined to numerically calculate the torque with a script using MATLAB™ from The MathWorks, Inc. of Natick, Mass.

Figure 12A:
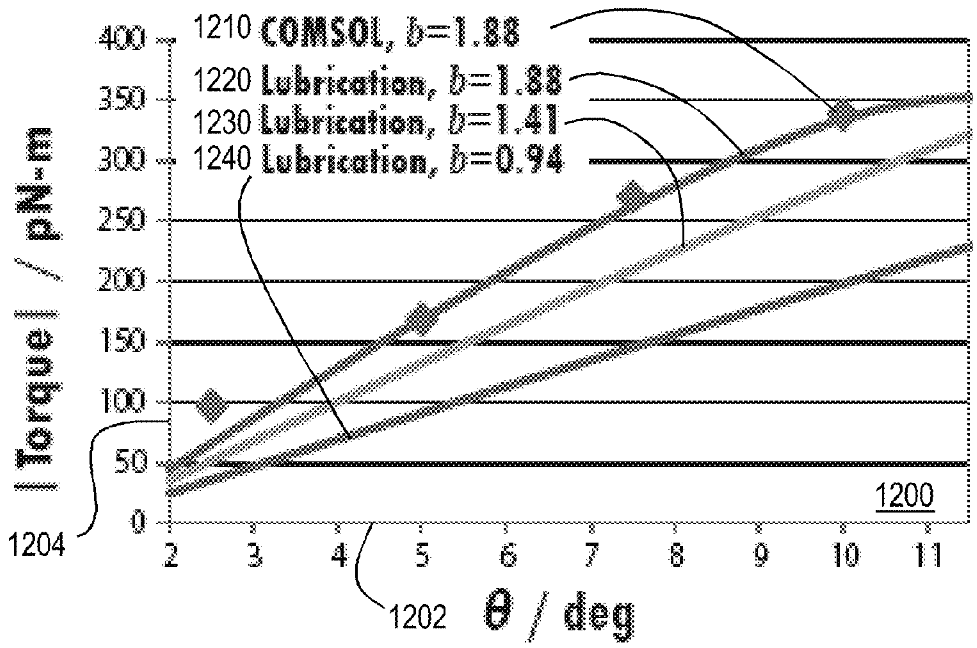
FIG. 12A is a graph that illustrates restoring forces on microparticles that are not aligned with a microfluidics channel, according to various embodiments.

FIG. 12A is a graph that illustrates restoring forces on microparticles that are not aligned with a microfluidics channel, according to various embodiments. The horizontal axis 1202 indicates the deflection angle θ in degrees. The vertical axis indicates the torque at the middle of the trailing edge of the particle in picoNewtons (pN) per meter (1 pN=$10^{-12}$ Newtons). The numerical result is given by the diamonds 1210. The ratio of particle length-to-channel width is given by the parameter b. The lubrication approximation for values of b equal to 1.88, 1.41 and 0.94 are given as traces 1220, 1230 and 1240, respectively. Calculations are based on a 1.5 psi drop across a 700-μm long detection zone containing a single particle. Re of the flow upstream of the particle is ≈15.

Figure 12B:
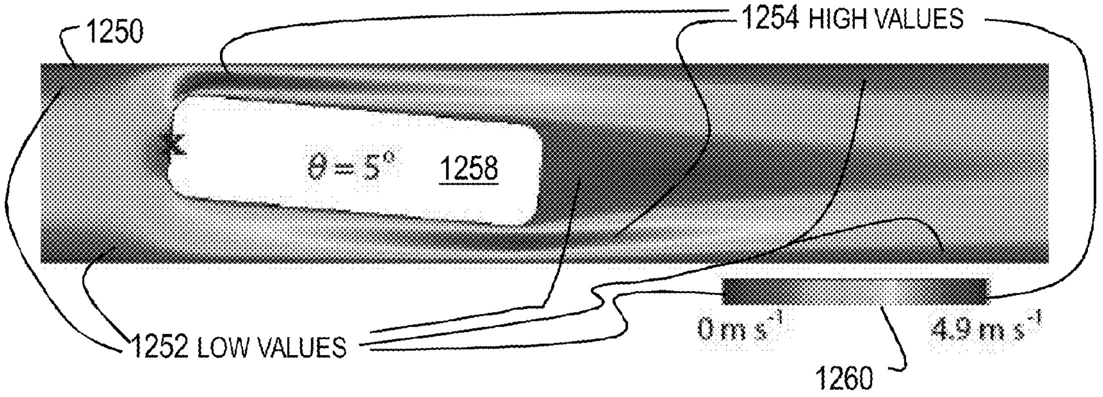
FIG. 12B is a map that illustrates fluid speeds passing a microparticle that is not aligned with a microfluidics channel, according to an embodiment.

As expected, the torque about a central point on the particle's trailing edge increased as the deviation from lengthwise orientation grew. This torque always acted to restore the lengthwise orientation, and its magnitude was greater for particles with higher values of b. This trend reinforces earlier observations regarding alignment tendencies and particle dimensions. For the case b=1.88, results of the lubrication approximation agree well with the torques calculated for various values of θ using 2-D COMSOL simulations. FIG. 12B is a map that illustrates fluid speeds passing a microparticle that is not aligned with a microfluidics channel, according to an embodiment. Here the deflection angle θ is 5 degrees, and speeds peak at 4.9 m/s in jets induced where the particle comes closest to the channel wall.

Figure 13A:
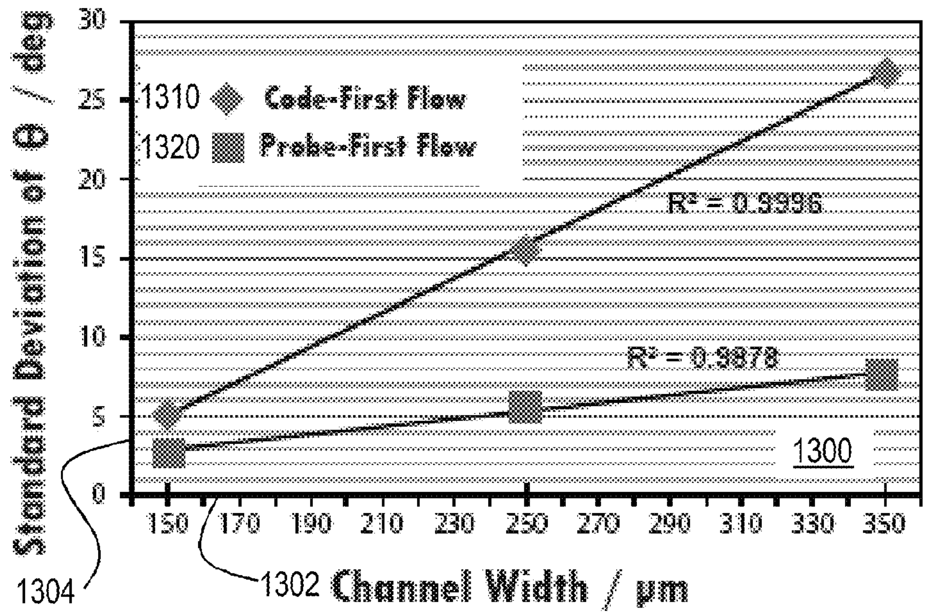
FIG. 13A and FIG. 13B are graphs that illustrate stability of microparticle alignment within a microfluidics channel based on orientation of the microparticle, according to an embodiment.
Figure 13B:
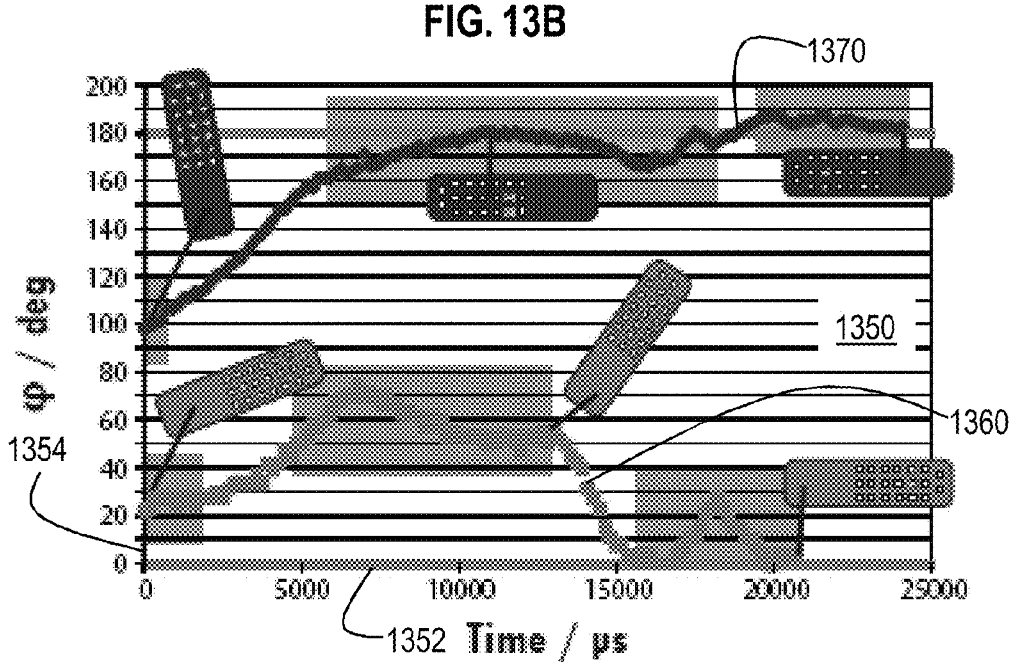

To further understand the flow in device embodiment B, the orientation of particles was recorded by measuring the acute angle (θ) between the major axis of the particle and the centerline of the channel as particles moved through the upstream contraction points (θ=−α, see FIG. 1). An indication of alignment tendency can be obtained by measuring the standard deviation in this angle at the end of each constant width portion of the central channel for a collection of 85 particles. FIG. 13A and FIG. 13B are graphs that illustrate stability of microparticle alignment within a microfluidics channel based on orientation of the microparticle, according to an embodiment. FIG. 13A is a plot 1300 of deviation of θ with channel width in the upstream region for particles that flow code-first or probe-first. The horizontal axis 1302 indicates channel width Wd in microns. The vertical axis 1304 indicates the standard deviation of θ in degrees. The code first flows are indicated by the diamonds 1310; and the probe-first flows are indicated by squares 320. The larger deviation exhibited by the code-first particles suggests that such an orientation is less stable than the probe-first orientation. Measurements were taken at the end of the corresponding constant width region prior to contraction.

The results indicate a nearly linear decrease in deviation as the channel width decreases for both of the orientations. The larger deviations in θ for code-first particles suggest this orientation is not driven to alignment in the flow as strongly as probe-first particles. Indeed, of the 85 particles studied, four switched from code-first to probe-first during flow, while none made the transition from probe-first to code-first. A closer examination of one particle of each orientation reinforces this induction. For each frame of video, the full angle between the long axis and the centerline (ϕ) was measured to preserve orientation information, with code-first corresponding to ϕ=0° and ϕ increasing in the counter-clockwise direction. FIG. 13 B is a plot 1350 of ϕ over the course of the travels of two particles through the upstream portions of the central channel. The horizontal axis 1352 indicates time in microseconds (μs, 1 μs=$10^{-6}$ seconds), and the vertical axis 1354 indicates the orientation ϕ of the particle (0 for code first, and 180 for probe first). Trace 1360 indicates the orientation of a first particle that starts nearly in a code first orientation; and trace 1370 indicates the orientation of a different particle that starts nearly in a probe forward orientation.

The probe-first orientation is seen to be achieved in a smoother and more predictable fashion than the code-first orientation, again suggesting that the probe-first orientation is more stable. While the probe-first particle experiences limited disruptions in the regions of constant width (shaded boxes), the code-first particle experiences two sharp alterations in alignment. From left to right, the constant-width regions measure 350, 250, and 150 microns in width, respectively.

Despite starting only 20° from a lengthwise orientation, the code-first particle nearly moves into a widthwise orientation before rotating back into a code-first alignment that oscillates quite dramatically as the channel width approaches 150 μm. Meanwhile, the probe-first particle behaves in a much more controlled and predictable manner, with a rapid transition from widthwise to lengthwise orientation before a relatively mild oscillation about ϕ=180°.

These analyses provide insight into the preferential orientation that was observed in every trial with the half-probe/half-code particle embodiments, including those in which both regions were polymerized from DA30. Of the 3,200 bifunctional particles analyzed in A, B, and C device embodiments, 83% flowed probe-first, compared to 79% of the 300 pure-DA30 particles. This indicates that the flexibility difference in the bifunctional design plays, at most, a minor role in the preference. The measurements of rotational tendency in the upstream region imply that the resistance to fluid flow in the thin height gaps (each about 1 micron to about 2 microns) above and below the code region is different from the resistance in the height gaps above and below the probe. This disparity can be observed directly by comparing the lateral wobbles of a code-first particle to the smooth, settled flow of a probe-first particle in the upstream regions of a channel shown in FIG. 13B. While it is tempting to attribute this resistance difference to the relative stiffness of the code region, the data from the pure DA30 trials refute this suggestion.

The holes that constitute the graphical code are the only other source of asymmetry in the particle and thus appear to give rise to the resistance difference. It seems that the flow pattern and the resulting pressure gradient along the length of the particle in the height gap depend on whether the holes are on the leading or the trailing edge of the particle. This hypothesis is supported by the observed velocity disparity between code-first and probe-first particles noted earlier for bifunctional particles as well as pure DA30 particles.

It has been shown that a plurality of sufficiently spaced side-focusing streams, a detection zone of ample width, and a moderate particle loading concentration are advantageous for high-throughput flow alignment of graphically encoded hydrogel microparticles. In addition, the reliable alignment of soft particles in high-speed flows (without deformation or clogging) is greatly enhanced by balancing the mechanical properties and morphology of the particles to ensure efficient focusing by hydrodynamic forces while still maintaining overall structural integrity in areas of high shear. The high throughputs achieved in the example embodiments (40 particles/s) compare favorably with those of currently available technologies for analyzing hard-sphere suspension arrays. The use of multiple probe strips on each particle in some embodiments has the potential to greatly augment this processing capacity.

Other Embodiments

Additional flow trials were conducted in two channel embodiments that did not use sheath streams (N=0). These embodiments featured only a central channel (of the same length as the central channel in A, B, and C) that gradually tapered to a final width of either 100 microns (D) or 150 microns (E). The final width persisted for 2.6 mm in D and 3.4 mm in E. Bifunctional particles with 7 micron hole column spacing were used for these trials. At throughputs of only about 20 particles/s, success rates were lower (83% for D, 97% for E) than those in channels with side streams and abrupt contractions. A throughput of about 40 particles/s in E led to only a 92% rate of success. Analysis of the upstream behavior in these simple taper channels revealed a disordered flow of tumbling particles, as well as particles that slowly traveled along the walls of the channel (a behavior that was seen earlier in single-focus devices).

While many of these particles were able to eventually adopt a proper orientation further downstream, the disordered upstream tendencies led to a flow pattern and velocity distribution in the detection zone that exhibited more variability than those of designs with sheath flow. Indeed, for comparable throughputs, the standard deviation of particle velocity in D was 40% greater than in A and the deviation in E was 47% greater than in C. In many instances, consecutive particles in the detection zone in D and E were touching one another, with some even wedging a small portion of their probe region under the code region traveling ahead of it. These observations indicate poor conditioning of the particles in the upstream region and underscore the importance of side streams for the reliable establishment of well-ordered, single-file particle flows.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus comprising a body structure having formed therein a plurality of microfluidic channels each having at least one dimension in a size range from about 0.1 micron to about 500 micrometers (μm, 1 μm=$10^{-6}$ meters), the plurality of microfluidic channels comprising:

a central channel; and a plurality of focusing channels in fluid communication with the central channel through a plurality of junctions, wherein a width of the central channel is smaller in a portion downstream of each junction than in a portion upstream of that junction.

2. The apparatus as recited in claim 1, further comprising a fluid inlet, wherein the plurality of focusing channels and the central channel are in fluid communication with the same fluid inlet.

3. The apparatus as recited in claim 2, wherein:

the apparatus is used to detect target binding to a microparticle having a particle width in a range from about 0.1 μm to about 500 μm; and each focusing channel of the plurality of focusing channels has a focusing channel width less than the particle width.

4. The apparatus as recited in claim 1, wherein:

the apparatus is used to detect target binding to a microparticle having a particle width in a range from about 0.1 μm to about 500 μm; and a smallest width portion of the central channel is about twice the particle width.

5. The apparatus as recited in claim 1, wherein the width of the central channel decreases at each junction and is constant in a portion between successive junctions of the plurality of junctions.

6. The apparatus as recited in claim 1, wherein the width of the central channel decreases at each junction by less than about 400 μm, and is constant in a portion between successive junctions of the plurality of junctions.

7. The apparatus as recited in claim 1, wherein:

the apparatus is used to detect target binding to a microparticle having a particle width and a particle length no less than the particle width, both in a range from about 0.1 μm to about 500 μm; and the width of the central channel decreases abruptly at each junction by less than about twice the particle length, and is constant between successive junctions of the plurality of junctions.

8. The apparatus as recited in claim 1, wherein successive junctions of the plurality of junctions are spaced apart along the central channel more than about 400 μm.

9. The apparatus as recited in claim 1, wherein:

the apparatus is used to detect target binding to a microparticle having a particle width and a particle length no less than the particle width, both in a range from about 0.1 μm to about 500 μm; and successive junctions of the plurality of junctions are spaced apart along the central channel more than about twice the particle length.

10. The apparatus as recited in claim 4, the apparatus is used to detect target binding to a microparticle having a particle width in a range from about 10 μm to about 90 μm and a particle length no less than the particle width in a range from about 90 μm to about 300 μm.

* * * * *